United States Patent
Siomina et al.

(10) Patent No.: US 11,239,982 B2
(45) Date of Patent: Feb. 1, 2022

(54) CONTROLLING THE IMPACT OF SRS SWITCHING ON CARRIER AGGREGATION ACTIVATION-RELATED DELAYS

(71) Applicant: TELEFONAKTIEBOLAGET LM ERICSSON (PUBL), Stockholm (SE)

(72) Inventors: Iana Siomina, Täby (SE); Muhammad Kazmi, Sundbyberg (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/346,210

(22) PCT Filed: Nov. 2, 2017

(86) PCT No.: PCT/IB2017/056836
§ 371 (c)(1),
(2) Date: Apr. 30, 2019

(87) PCT Pub. No.: WO2018/083631
PCT Pub. Date: May 11, 2018

(65) Prior Publication Data
US 2019/0305918 A1 Oct. 3, 2019

Related U.S. Application Data

(60) Provisional application No. 62/417,452, filed on Nov. 4, 2016.

(51) Int. Cl.
*H04L 5/00* (2006.01)
*H04W 76/25* (2018.01)
*H04W 76/36* (2018.01)

(52) U.S. Cl.
CPC ............ *H04L 5/0098* (2013.01); *H04L 5/001* (2013.01); *H04L 5/0051* (2013.01);
(Continued)

(58) Field of Classification Search
CPC ..... H04L 5/001; H04L 5/0051; H04L 5/0053; H04L 5/0098; H04W 76/25; H04W 76/36
See application file for complete search history.

(56) References Cited

U.S. PATENT DOCUMENTS 8,897,253 B2 * 11/2014 Shin ................ H04L 5/0044
370/330
9,107,209 B2 * 8/2015 Liu .................... H04L 5/001
(Continued)

FOREIGN PATENT DOCUMENTS

JP 2013520053 A 5/2013
JP 2014082733 A 5/2014
(Continued)

OTHER PUBLICATIONS

Huawei et al: "Discussion on interruption requirements on SRS switching", 3GPP Draft; R4-167824, 3rd Generation Partnership Project (3GPP), Mobile Competence Centre; 650, Route Des Lucioles; F-06921 Sophiaantipolis Cedex; France, vol. RAN WG4, No. Ljubljana, Slovenia; Oct. 19, 2016.
(Continued)

*Primary Examiner* — Alpus Hsu
(74) *Attorney, Agent, or Firm* — Christopher & Weisberg, P.A.

(57) ABSTRACT

Methods and related nodes are disclosed that can enable the control of the impact of SRS switching on carrier aggregation activation delays. In some aspects, the method comprises determining a need to perform a carrier aggregation (CA) activation procedure, determining a need to perform a sounding reference signal (SRS) switching procedure, extending a delay associated with the CA activation procedure in order to allow the UE to perform the SRS switching procedure, and performing the CA activation procedure within the extended delay.

22 Claims, 9 Drawing Sheets

(52) U.S. Cl.
CPC ........... *H04L 5/0053* (2013.01); *H04W 76/25* (2018.02); *H04W 76/36* (2018.02)

(56) References Cited

U.S. PATENT DOCUMENTS

| | | | |
|---|---|---|---|
| 9,723,618 B2* | 8/2017 | Loehr | H04W 72/1268 |
| 9,820,332 B2* | 11/2017 | Lee | H04W 76/38 |
| 9,929,848 B2* | 3/2018 | Dinan | H04J 11/00 |
| 9,960,895 B2* | 5/2018 | Dinan | H04L 5/001 |
| 10,271,347 B2* | 4/2019 | Loehr | H04W 28/0278 |
| 2011/0134774 A1* | 6/2011 | Pelletier | H04L 5/001 370/252 |
| 2013/0244656 A1* | 9/2013 | Heo | H04N 21/6405 455/436 |
| 2015/0326377 A1* | 11/2015 | Freda | H04W 16/14 370/278 |
| 2016/0278073 A1* | 9/2016 | Dinan | H04W 36/04 |
| 2016/0278083 A1* | 9/2016 | Dinan | H04L 5/0053 |
| 2016/0338039 A1* | 11/2016 | Van Der Velde | H04W 76/10 |
| 2017/0118658 A1* | 4/2017 | Hwang | H04W 16/32 |
| 2017/0302419 A1* | 10/2017 | Liu | H04L 5/0078 |
| 2018/0098376 A1* | 4/2018 | Jang | H04W 72/1215 |

FOREIGN PATENT DOCUMENTS

| | | |
|---|---|---|
| WO | 2011/098236 A1 | 8/2011 |
| WO | 2014/050529 A1 | 3/2014 |
| WO | 2017/173388 A1 | 10/2017 |

OTHER PUBLICATIONS

Ericsson: "On RRM requirements impacts with SRS carrier based switching", 3GPP Draft; R4-168026 on RRM Requirements Impacts With SRS Carrier Based Switching, 3rd Generation Partnership Project (3GPP), Mobile Competence Centre ; 650, Route Des Lucioles ; F-06921 Sophia-Antipolis Cedex ; France, vol. RAN WG4, No. Ljubljana, Slovenia; Oct. 19, 2016.

Catt: Discussion on impact on RRM requirements for SRS carrier switching11 , 3GPP Draft; R4-163357, 3rd Generation Partnership Project (3GPP), Mobile Competence Centre ; 650, Route Des Lucioles ; F-06921 Sophia-Antipolis Cedex ; France, vol. RAN WG4, No. Nanjing, China; May 23, 2016, May 22, 2016.

3GPP TS 36.213 V13.3.0 (Sep. 2016) 3rd Generation Partnership Project; Technical Specification Group Radio Access Network; Evolved Universal Terrestrial Radio Access (E-UTRA); Physical Layer Procedures (Release 13), consisting of 385 pages.

3GPP TS 36.133 V14.1.0 (Sep. 2016) 3rdGeneration Partnership Project; Technical Specification Group Radio Access Network; Evolved Universal Terrestrial Radio Access (E-UTRA); Requirement for Support of Radio Resource Management (Release 14), consisting of 8 pages.

International Search Report and Written Opinion dated Jan. 18, 2018 issued in PCT Application No. PCT/IB2017/056836, consisting of 9 pages.

International Preliminary Report on Patentability dated Jan. 30, 2019 issued in PCT Application No. PCT/IB2017/056836, consisting of 12 pages.

Korean Office Action and English translation of same dated Aug. 11, 2020 issued in Korean Application No. 10-2019-7012844, consisting of 9 pages.

Japanese Office Action and English Summary thereof dated Jul. 27, 2020 issued in Japanese Application No. 2019-522780, consisting of 11 pages.

Huawei, HiSilicon 3GPP TSG-RAN WG2 Meeting #95bis; R2-166633, Kaohsiung, Oct. 10-14, 2016; Title: Capture the High layer Impacts on SRS Carrier Based Switching for LTE; Source to TSG: R2; Work Item Code: LTE_SRS_CS, consisting of 24 pages.

Korean Notice of Final Rejection and English translation of same dated Dec. 28, 2020 issued in Korean Patent Application No. 10-2019-7012844, consisting of 6 pages.

* cited by examiner

CONTROLLING THE IMPACT OF SRS SWITCHING ON CARRIER AGGREGATION ACTIVATION-RELATED DELAYS

RELATED APPLICATIONS

The present application claims the benefits of priority of U.S. Provisional Patent Application No. 62/417,452, entitled "CONTROLLING THE IMPACT OF SRS SWITCHING ON CARRIER AGGREGATION ACTIVATION-RELATED DELAYS", and filed at the United States Patent and Trademark Office on Nov. 4, 2016, the content of which is incorporated herein by reference.

TECHNICAL FIELD

The present description generally relates to wireless communications and wireless communication networks, and more particularly relates to reference signals and reference signaling in wireless communication networks supporting carrier aggregation.

BACKGROUND

Sounding Reference Signals

Sounding reference signals (SRS) are known signals that are transmitted by user equipments (UEs) to allow, for instance, the base station (e.g., eNB) to estimate different uplink channel properties. These estimates may be used for uplink scheduling and link adaptation but also for downlink multiple antenna transmission, especially in case of TDD where the uplink and downlink use the same frequencies. The SRS are shown in FIG. 1 and generally have a time duration of a single OFDM symbol.

SRS can be transmitted in the last symbol of a 1 ms uplink subframe, and for the case with TDD, the SRS can also be transmitted in the special slot UpPTS. The length of UpPTS can be configured to be one or two symbols. In FIG. 2, an example is given for TDD with 3 downlink (DL) subframes and 2 uplink (UL) subframe. Generally, within a 10 ms radio frame, up to eight symbols may be set aside for sounding reference signals (SRS).

The configuration of SRS symbols, such as SRS bandwidth, SRS frequency domain position, SRS hopping pattern, and SRS subframe configuration are set semi-statically as a part of RRC information element.

There are two types of SRS transmission in LTE UL: 1) periodic SRS transmissions, and 2) aperiodic SRS transmissions. Periodic SRS is transmitted at regular time instances as configured by means of RRC signaling. Aperiodic SRS is a one-shot transmission that is triggered by signaling in PDCCH.

There are two different configurations related to SRS:
Cell specific SRS configuration; and
UE specific configuration.

The cell specific configuration indicates what subframes may be used for SRS transmissions within the cell as illustrated in FIG. 2. The UE specific configuration indicates to the UE a pattern of subframes (among the subframes reserved for SRS transmission within the cell) and frequency domain resources to be used for SRS transmission of that specific UE. It also includes other parameters that the UE can use when transmitting the signal, such as frequency domain comb and cyclic shift.

This means that sounding reference signals from different UEs can be multiplexed in the time domain, by using UE-specific configurations such that the SRS of two UEs are transmitted in different subframes. Furthermore, within the same symbol, sounding reference signals can be multiplexed in the frequency domain. The set of subcarriers can be divided into two sets of subcarriers, or combs, with the even and odd subcarriers respectively in each such set. Additionally, UEs may have different bandwidths to get additional FDM (The comb enables frequency domain multiplexing, or FDM, of signals with different bandwidths and also overlapping). Additionally, code division multiplexing can be used. In such cases, different users can use exactly the same time and frequency domain resources by using different shifts of a basic base sequence.

SRS Carrier Based Switching

In LTE networks, there are many kinds of downlink heavy traffic, which typically leads to a larger number of aggregated downlink component carriers (CC) than the number of (aggregated) uplink CCs. For the existing UE categories, the typical carrier aggregation (CA) capable UEs only support one or two uplink CCs while up to 5 CCs can be aggregated in downlink.

Some of the TDD carriers with DL transmission for the UE will have no UL transmission including SRS, and channel reciprocity cannot be used for these carriers. Such situations may become more severe with CA enhancement of up to 32 CCs where a large portion of CCs are TDD. Allowing fast carrier switching to and between TDD UL carriers may be a solution to allow SRS transmission on these TDD carriers.

SRS based carrier switching is aiming to support SRS switching to and between TDD component carrier(s), where the component carriers available for SRS transmission correspond to the component carriers available for carrier aggregation of PDSCH, while the UE has fewer component carriers available for carrier aggregation of PUSCH.

SRS based carrier switching simply means that during certain time resources the UE does not transmit any signal on one carrier (e.g. F1) while it transmits SRS on another carrier (e.g. F2). For example, F1 and F2 can be PCell and SCell respectively, or both of them can be SCells.

CA-Related Interruptions in LTE

The current CA-related interruption requirements are specified in 36.133, 3GPP TS 36.133, V13.3.0, e.g., as below.

=====<<<<<<TS 36.133>>>>>>=====

7.8.2.3 Interruptions at SCell Activation/Deactivation for Intra-Band CA

When an intra-band SCell is activated or deactivated as defined in [2] the UE is allowed an interruption of up to 5 subframes on PCell during the activation/deactivation delay defined in Section 7.7. This interruption is for both uplink and downlink of PCell.

7.8.2.4 Interruptions at SCell Activation/Deactivation for Inter-Band CA

When an inter-band SCell is activated or deactivated as defined in [2] the UE that requires interruption is allowed an interruption of up to 1 subframe on PCell during the activation/deactivation delay defined in Section 7.7. This interruption is for both uplink and downlink of PCell.

=====<<<<<<TS 36.133>>>>>>=====

Similar interruptions may occur also due to SRS switching.

Multi-Carrier Serving Cell Setup or Release Procedure in LTE

A multi-carrier serving cell setup herein refers to a procedure which enables the network node to at least temporarily setup or release a secondary serving cell at the UE for multi-carrier operation, e.g., the use of an SCell in CA capable UE, PSCell in dual connectivity (DC), etc. Herein the serving cell setup or release procedure or command can perform any one or more of:

Configuration of SCell(s), also referred to as SCell addition;
De-configuration of SCell(s), also referred to as SCell release;
Activation of SCell(s);
Deactivation of SCell(s);
Configuration of PSCell in DC, also referred to as PSCell addition;
De-configuration of PSCell in DC, also referred to as PSCell release.

On the one hand, the configuration procedure (e.g. configuration of SCell, addition of PSCell, etc.) is used by the serving radio network node (e.g., eNB) to configure a multicarrier UE capable with one or more serving cells (SCells, PSCell, etc.). On the other hand, the de-configuration procedure is used by the serving radio network node (e.g., eNB) to de-configure or remove one or more already configured serving cells. The configuration or de-configuration procedure is also used to change the current multicarrier configuration, e.g., for increasing or decreasing the number of SCells or for swapping the existing SCells with new ones.

The serving radio network node can activate one or more deactivated serving cells or deactivate one or more activated serving cells on the corresponding configured secondary carriers. The PCell is always activated. Therefore, SCell can be activated or deactivated.

SCell Activation Delay

In 3GPP TS 36.133, v14.1.0, SCell activation delay refers to the delay within which the UE shall be able to activate a deactivated SCell in E-UTRA carrier aggregation. According to this requirement, upon receiving SCell activation command in subframe n, the UE shall be capable to transmit valid CSI report and apply actions related to the activation command for the SCell being activated no later than in subframe n+24 for a known cell. And, for an unknown cell, upon receiving the SCell activation command in subframe n, the UE shall be capable to transmit valid CSI report and apply actions related to the activation command for the SCell being activated no later than in subframe n+34 provided the SCell can be successfully detected on the first attempt. Furthermore, while activating an SCell if any other SCell is activated, deactivated, configured or deconfigured by the UE then the UE shall meet the SCell activation delay requirements ($T_{activate\_total}$) according to the expression:

$$T_{activate\_total} = T_{activate\_basic} + 5 \times \sum_{i=1}^{N-1} K_i$$

where:

$T_{activate\_total}$ is the total time to activate a SCell and is expressed in subframes;

$T_{activate\_basic}$ is the SCell activation delay without another cell activation/deactivation, etc.;

$K_i$ ($0 \leq K_i \leq [3]$) is the number of times the other $i^{th}$ SCell is activated, deactivated, configured or deconfigured while the SCell is being activated; and N ($2 \leq N \leq 4$) is the maximum number of SCells supported by the UE.

The valid CSI is based on the UE measurement and corresponds to any CQI value specified in 3GPP TS 36.213, with the exception of CQI index=0 (out of range).

Furthermore, the PCell interruption shall not occur before subframe n+5 and not occur after subframe n+9 when PCell belongs to E-UTRA FDD. And the PCell interruption shall not occur before subframe n+5 and not occur after subframe n+11 when PCell belongs to E-UTRA TDD.

During SCell activation, the UE will typically perform the following actions:

decode the MAC CE containing the activation command and send back ACK (e.g. 4 ms in LTE);
perform all the internal steps needed to activate the SCell (these depend on implementation), one of which is to turn on the RF chain that will be processing the CC;
adjust the AGC (this step will depend on whether the cell is known or not, when the cell was last measured, etc.);
acquire the exact timing of the cell (this step also depends on whether the cell is known or unknown);
process an instance of radio signals based on which it should compute the CQI and report the CQI to the eNB (e.g., 4 ms in LTE).

PSCell Addition Delay

PSCell activation delay refers to the delay within which the UE shall be able to configure a PSCell in E-UTRA dual connectivity. According to 3GPP TS 36.133, upon receiving PSCell addition in subframe n, the UE shall be capable to transmit PRACH preamble towards PSCell no later than in subframe $n+T_{config\_Pscell}$, where:

$$T_{config\_PSCell} = 20 \text{ ms} + T_{activation\_time} + 50 \text{ ms} + T_{PCell\_DU} + T_{PSCell\_DU}$$

$T_{activation\_time}$ is the PSCell activation delay. If the PSCell is known, then $T_{activation\_time}$ is 20 ms. If the PSCell is unknown, then $T_{activation\_time}$ is 30 ms provided the PSCell can be successfully detected on the first attempt.

$T_{PCell\_DU}$ is the delay uncertainty due to PCell PRACH preamble transmission. $TP_{Cell\_DU}$ is up to 20 ms if PSCell activation is interrupted by a PCell PRACH preamble transmission, otherwise it is 0.

$T_{PSCell\_DU}$ is the delay uncertainty in acquiring the first available PRACH occasion in the PSCell. $T_{PSCell\_DU}$ is up to 30 ms.

SUMMARY

In some instances, a UE configured with SRS carrier based switching may not be able to transmit in time a valid CSI report or a PRACH preamble and may not meet the existing respective requirements for carrier aggregation activation delays, e.g., SCell activation delay and PSCell addition delay. Deactivation delays may also be impacted.

According to a broad aspect, a UE configured with SRS switching adaptively performs at least one carrier aggregation activation procedure (e.g., SCell activation procedure, SCell deactivation procedure, PSCell addition procedure, or PSCell release procedure).

According to one aspect, some embodiments include a method performed in a UE, the method comprising determining a need to perform a carrier aggregation, CA, activation procedure, determining a need to perform a sounding reference signal (SRS) switching procedure, extending a delay associated with the CA activation procedure in order to allow the UE to perform the SRS switching procedure, and performing the CA activation procedure within the extended delay.

In some embodiments, determining the need to perform the CA activation procedure may comprise, or further comprise, receiving, from a radio network node, a message comprising instructions to perform the carrier aggregation, CA, activation procedure.

In some embodiments, the CA activation procedure may be a secondary cell, SCell, activation or an SCell deactivation. When the CA activation procedure is an SCell activation, the message comprising instructions to perform a CA activation procedure may be a medium access control, MAC, control element, CE, comprising an SCell activation command. When the CA activation procedure is an SCell deactivation, the message comprising instructions to perform a CA activation procedure may be a medium access control, MAC, control element, CE, comprising an SCell deactivation command.

When the CA activation procedure is an SCell activation, performing the CA activation procedure within the extended delay may comprise, or further comprise, activating the SCell and transmitting a channel status information, CSI, report, to the radio network node or to another radio network node. When the CA activation procedure is SCell deactivation, performing the CA activation procedure within the extended delay may comprise, or further comprise, deactivating the SCell.

In some embodiments, the CA activation procedure may be a primary secondary cell, PSCell, addition or a PSCell release. When the CA activation procedure is a PSCell addition, the message comprising instructions to perform a CA activation procedure may be a radio resource configuration, RRC, message comprising a pSCellToAddMod field. When the CA activation procedure is a PSCell release, the message comprising instructions to perform the CA activation procedure may be a radio resource configuration, RRC, message comprising a pSCellToAddMod field.

When the CA activation procedure is a PSCell addition, performing the CA activation procedure within the extended delay may comprise, or further comprise, configuring the PSCell. When the CA activation procedure is a PSCell release, performing the CA activation procedure within the extended delay may comprise, or further comprise, releasing the PSCell.

In some embodiments, determining the need to perform the SRS switching procedure may comprise, or further comprise, receiving a SRS request message from the radio network node.

According to another aspect, some embodiments include a UE configured, or operable, to perform one or more UE functionalities (e.g. steps, actions, etc.) as described herein.

In some embodiments, the UE may comprise a communication interface configured to communicate with one or more other UEs, with one or more radio nodes, and/or with one or more network nodes, and processing circuitry operatively connected to the communication interface, the processing circuitry being configured to perform one or more UE functionalities as described herein. In some embodiments, the processing circuitry may comprise at least one processor and at least one memory storing instructions which, upon being executed by the processor, configure the processor to perform one or more UE functionalities as described herein.

In some embodiments, the UE may comprise one or more functional modules configured to perform one or more UE functionalities as described herein.

According to another aspect, some embodiments include a computer program product comprising a non-transitory computer readable storage medium storing computer readable program instructions or code which, upon being executed by processing circuitry (e.g., a processor) of the UE, configure the processing circuitry to perform one or more UE functionalities as described herein.

Some embodiments may enable the UE to meet carrier aggregation procedure requirements (e.g. SCell (de)activation requirements, PSCell addition/release requirements, etc.) when also performing SRS switching.

This summary is not an extensive overview of all contemplated embodiments, and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which.

DETAILED DESCRIPTION

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Figure 1:
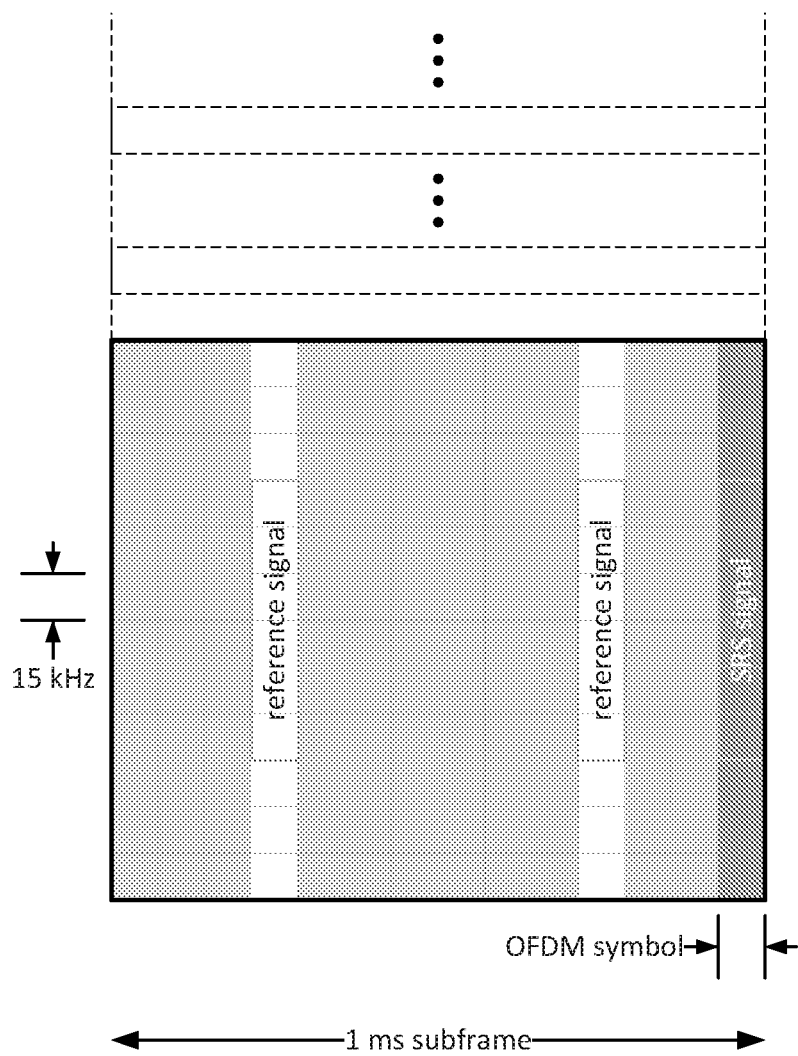
FIG. 1 is a diagram of an uplink subframe in which SRS can be transmitted in accordance with some embodiments.
Figure 2:
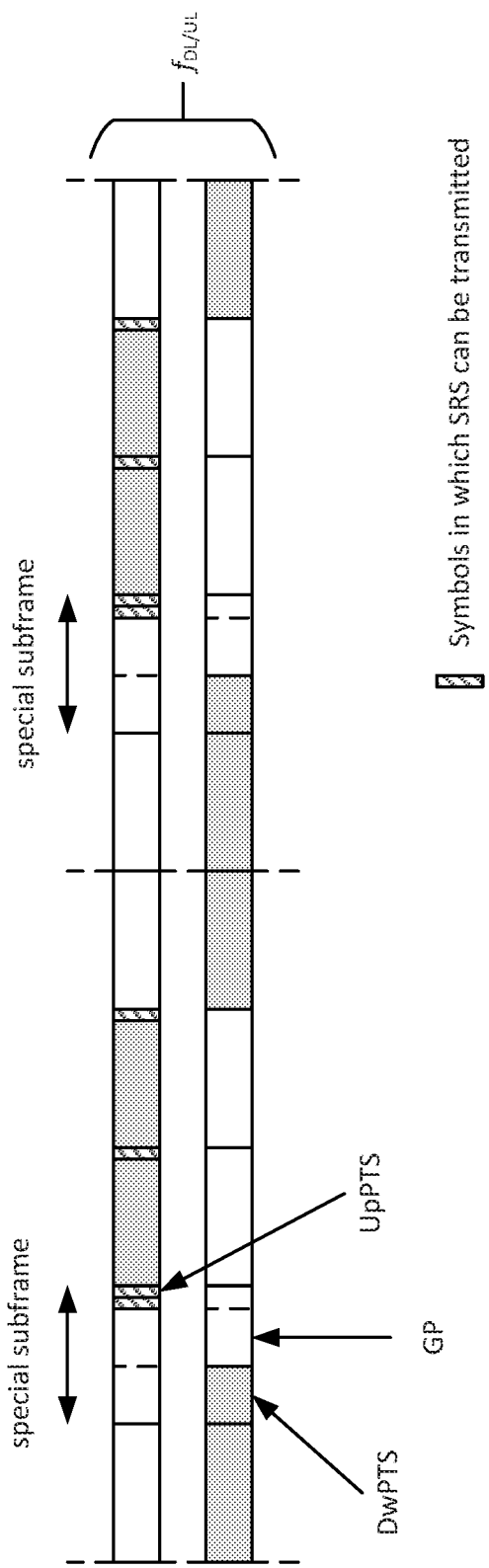
FIG. 2 is a diagram of an example of downlink and uplink subframes configuration in TDD.
Figure 3:
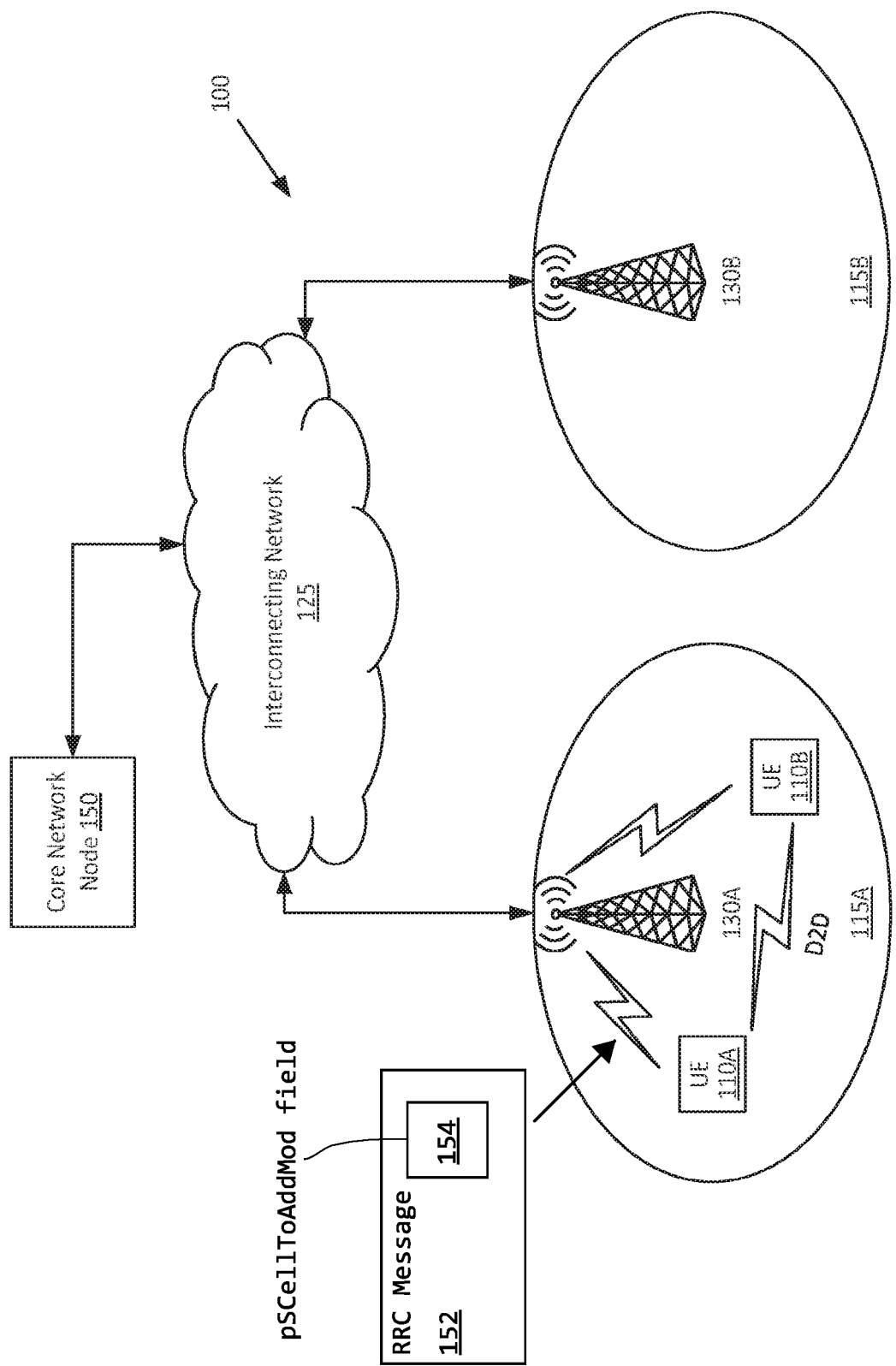
FIG. 3 is a schematic diagram of an example wireless communication network in accordance with some embodiments.

FIG. 3 illustrates an example of a wireless network 100 that may be used for wireless communications. Wireless network 100 includes UEs 110A-110B and a plurality of radio network nodes 130A-130B (e.g., eNBs, gNBs, etc.) connected to one or more core network nodes 150 via an interconnecting network 125. The network 100 may use any suitable deployment scenarios. UEs 110 within coverage areas 115A and 115B may each be capable of communicating directly with radio network nodes 130 over a wireless interface. In certain embodiments, UEs may also be capable of communicating with each other via device-to-device (D2D) communication.

As an example, UE 110A may communicate with radio network node 130A over a wireless interface. That is, UE 110A may transmit wireless signals to and/or receive wireless signals from radio network node 130A. The wireless signals may contain voice traffic, data traffic, control signals, and/or any other suitable information. In some embodiments, an area of wireless signal coverage associated with a radio network node 130 may be referred to as a cell.

The terms "user equipment" or "UE" may be used herein to refer to any type of wireless device capable of communicating with a network node and/or with another UE in a cellular or mobile or wireless communication system. Examples of UE include target device, device to device (D2D) UE, machine type UE or UE capable of machine to machine (M2M) communication, personal digital assistant (PDA), tablet, mobile terminal, smart phone, laptop embedded equipped (LEE), laptop mounted equipment (LME), USB dongle, etc.

The term "network node" may be used herein to refer to a radio network node or another network node, e.g., a core network node, MSC, MME, O&M, OSS, SON, positioning node (e.g. E-SMLC), MDT node, etc.

The term "radio network node" may be used herein to refer to any kind of network node comprised in a radio network which may further comprise any of base station (BS), radio base station, base transceiver station (BTS), base station controller (BSC), radio network controller (RNC), evolved Node B (eNB or eNodeB), Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS) etc.

The terms "radio access technology" or "RAT" may be used herein to refer to any RAT e.g. UTRA, E-UTRA, narrow band internet of things (NB-IoT), Wi-Fi, Bluetooth, next generation RAT (NR), 4G, 5G, etc. Both UEs and network nodes may be capable of supporting a single or multiple RATs.

A UE may be configured to operate in carrier aggregation (CA) implying aggregation of two or more carriers in at least one of DL and UL directions. With CA, a UE can have multiple serving cells, wherein the term "serving" herein means that the UE is configured with the corresponding serving cell and may receive data from and/or transmit data to the network node on the serving cell e.g. on PCell or any of the SCells. The data is transmitted or received via physical channels e.g. PDSCH in DL, PUSCH in UL etc. A component carrier (CC) also interchangeably called as carrier or aggregated carrier, PCC or SCC is configured at the UE by the network node using higher layer signaling e.g. by sending RRC configuration message to the UE. The configured CC is used by the network node for serving the UE on the serving cell (e.g. on PCell, PSCell, SCell, etc.) of the configured CC. The configured CC is also used by the UE for performing one or more radio measurements (e.g. RSRP, RSRQ, etc.) on the cells operating on the CC e.g. PCell, SCell or PSCell and neighboring cells.

The terms "dual connectivity" or "DC" may be used herein to refer to an operation mode wherein the UE can be served by at least two nodes called master eNB (MeNB) and secondary eNB (SeNB). More generally in multiple connectivity (also referred to as multi-connectivity) operations the UE can be served by two or more nodes e.g. MeNB, SeNB1, SeNB2 and so on. The UE is configured with PCC from both MeNB and SeNB. The PCell from MeNB and SeNB are called as PCell and PSCell respectively. The PCell and PSCell operate the UE typically independently. The UE can also be configured with one or more SCCs from each of MeNB and SeNB. The corresponding secondary serving cells served by MeNB and SeNB are called SCell. The UE in DC typically has separate transceivers for each of the connections with MeNB and SeNB. This allows the MeNB and SeNB to independently configure the UE with one or more procedures e.g. radio link monitoring (RLM), DRX cycle, etc. on their PCell and PSCell respectively.

The term "SRS" may be used herein to refer to any type of reference signal (RS) or more generally physical radio signals transmitted by the UE in the UL to enable the network node to determine the UL signal quality e.g. UL SNR, SINR, etc. Examples of such reference signals are sounding reference signals, DMRS, UE specific reference or pilot signals etc. The embodiments are applicable to any type of RS i.e. switching of carrier transmitting any type of RS.

The term "signal" used herein can be any physical signal, including reference signal such as PSS, SSS, CRS, PRS, etc.

The term "channel" (e.g., in the context of channel reception) used herein can be any physical channel e.g. MIB, PBCH, NPBCH, PDCCH, PDSCH, MPDCCH, NPDCCH, NPDSCH, ePDCCH, PUSCH, PUCCH, NPUSCH, etc.

The term "time resource" may be used herein to refer to any type of physical resource or radio resource expressed in terms of length of time. Examples of time resources include symbol, time slot, subframe, radio frame, TTI, interleaving time, etc.

The term "radio measurement" may be used herein to refer to any measurement based on receiving a radio signal or channel, e.g., power-based measurements such as received signal strength (e.g., RSRP or CSI-RSRP) or quality measurements (e.g., RSRQ, RS-SINR, SINR, Es/Iot, SNR); cell identification; synchronization signals measurements; angle measurements such as angle of arrival (AOA); timing measurements such as Rx-Tx, RTT, RSTD, TOA, TDOA, timing advance; throughput measurements; channel quality measurements such CSI, CQI, PMI. A measurement may be absolute, relative to a common reference or to another measurement, composite measurement (see U.S. 61/678,462 filed on Aug. 1, 2012), etc. A measurement may be on one link or more than one links (e.g., RSTD, timing advance, RTT, relative RSRP; measurements over multifarious links described in PCT/SE2012/050644 filed on Jun. 13, 2012, etc.). Measurements may also be differentiated by purpose and may be performed for one or more purposes, e.g., for one or more of: RRM, MDT, SON, positioning, timing control or timing advance, synchronization.

The term "radio measurement" may also be used in a broader sense, e.g., receiving a channel (e.g., receiving system information via broadcast or multicast channel).

The term "requirements" may be used herein to refer to any type of UE requirements related to UE measurements, e.g., measurement requirements, RRM requirements, mobility requirements, positioning measurement requirements etc. Examples of UE requirements related to UE measurements are measurement time, measurement reporting time or delay, measurement accuracy (e.g. RSRP/RSRQ accuracy), number of cells to be measured over the measurement time etc. Examples of measurement time are L1 measurement period, cell identification time or cell search delay, CGI acquisition delay, etc.

In some embodiments, SRS switching and SRS carrier based switching may be used interchangeably to describe transmitting SRS on different carriers. SRS switching may be based on a time and/or frequency domain pattern.

The term "CA activation procedure" may be used herein to comprise, e.g., activation or deactivation of one or more SCells, addition or release of a PSCell, etc. The CA activation procedure may also interchangeably be referred to as CA setup or release procedure, SCell setup or release procedure, serving cell setup or release procedure, etc.

A broad exemplary scenario comprises a UE being served by a first network node with a PCell operating on a first carrier frequency (f1), wherein the UE is also capable of being served by at least one secondary serving cell (SCell) also known as a first SCell. The UE may further be capable of being served by two or more SCells, e.g., the first SCell operates on a second carrier frequency (f2) and the second SCell operates on a third carrier frequency (f3). The same applies for more than two SCells. The carrier f1 is interchangeably called as PCC, while carriers f2, f3, . . . , f(n) may interchangeably be called as SCC1, SCC2, SCC(n−1), etc., respectively.

In one example, all f1, f2, and f3 belong to a licensed spectrum. In yet another example, carriers f1 and f3 may belong to a licensed spectrum or frequency band, whereas carrier f2 may belong to an unlicensed spectrum or frequency band. Other combinations are also possible. In an unlicensed spectrum or band, contention based transmission is allowed, i.e., two or more devices (UE or network nodes) can access the same part of spectrum based on certain fairness constraints, e.g. LBT. In this case, no operator (or user or transmitter) owns the spectrum. In a licensed spectrum or licensed band, only contention free transmission is allowed, i.e., only devices (UE or network nodes) allowed by the owner of the spectrum license can access the licensed spectrum. In one example of the use case, all carriers can be in unlicensed spectrum, or in a licensed shared spectrum or in a spectrum where LBT is required.

In one example, the CCs and the corresponding serving cells of a UE may be comprised all in the same node. In another example, at least two of them may be comprised in different nodes, which may be co-located or non-collocated.

In one example, all the CCs and the corresponding serving cells of a UE may be configured in the same timing advance group (TAG) e.g. pTAG. In another example some CCs and the corresponding serving cells of a UE may be configured in one timing advance group (TAG) (e.g. pTAG) and the remaining CCs may be configured in another TAG (e.g. sTAG). In yet another example, the UE may be configured with two or more TAGs.

The above scenarios may also comprise DC or multi-connectivity operations performed based on corresponding CA configurations, where PSCell in different embodiments may belong, e.g., to a set of SCells.

SRS switching (also referred to as switching SRS transmissions) may involve at least one of:
  starting SRS transmission on a first carrier frequency and/or stopping SRS transmission on a second carrier frequency, wherein the first and the second carrier frequency may belong to licensed and/or unlicensed spectrum, same RAT or different RATs. According to the earlier examples, the SRS carrier based switching may involve any one or more carriers of f1, f2, f3, . . . , f(n);
  starting and/or stopping SRS transmission from one or more antennas or antenna ports.

In one example, SRS switching may comprise carrier based SRS switching and/or antenna based SRS switching.

The SRS switching may be controlled by the network and/or by the UE.

Even though some embodiments are described for carrier based SRS switching, they are applicable for any SRS switching type.

Switching among carriers and/or antennas during SRS switching may also cause some interruptions, e.g., to PCell or activated SCell, which may be due to UE reconfiguration such as configuring and/or activating target carriers (to which the SRS transmission is switched to), deconfiguring and/or deactivating source carriers (from which SRS transmission is switched from), delays, reduced performance, etc.

Figure 4:
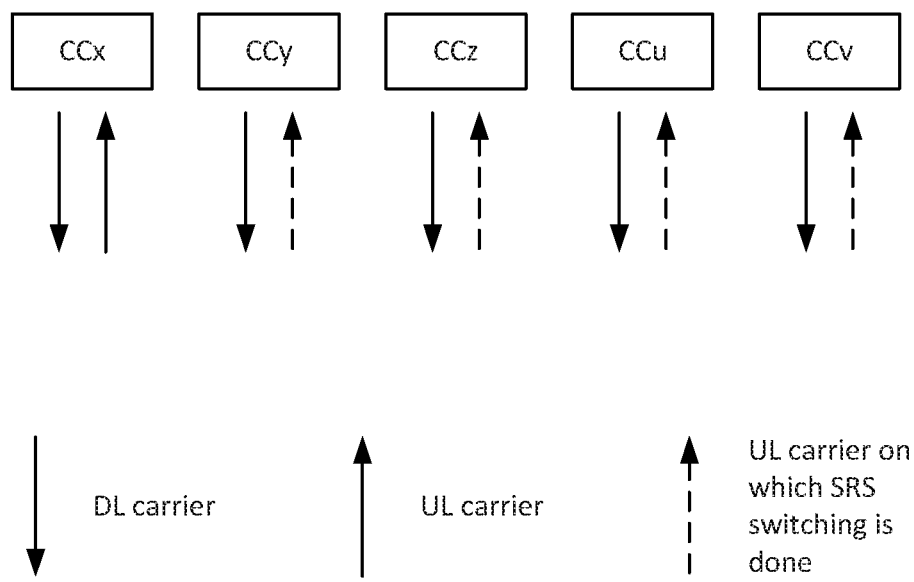
FIG. 4 is a schematic diagram of an example of SRS carrier based switching.

As an exemplary CC combination shown in FIG. 4, there is a CA arrangement with 5 DL component carriers and 2 UL component carriers. In this example, one UL component carrier is fixed in the PCell and the SRS switching is done on one of the SCells (e.g., from SCell1 to SCell2). So, at any point of time, it is a 2 UL component carriers combination. The same example scenario can also be shown with other numbers aggregated CCs in DL and UL respectively. The carriers, i.e. CCy, CCz, CCu and CCv, can be in different band also. For example, CCy can be in any band below 1 GHz, CCz can be in any band around 2 GHz, and CCu can be any band in 3.5 GHz.

The UE may be requested to switch SRS transmission to one or more serving cells by the network node. In some embodiments one or more SRS switching messages or commands may be received by the UE, e.g., via RRC signaling, via MAC CE command, or via a physical layer message (e.g., downlink control information (DCI) carried by a PDCCH), etc.

For example, the following signaling may apply:
  Receiving a first serving cell SRS switching request message or command from a second network node for switching SRS carrier from the first serving cell;
  Receiving a second serving cell SRS switching request message or command from a third network node for switching SRS carrier from the second serving cell;
  Receiving a third serving cell SRS switching request message or command from a fourth network node for switching SRS carrier from the third serving cell.

In some embodiments, at least some of the first, second, third, and fourth network nodes are the same or are co-located at the same site or location. For example, in such embodiments the UE may receive one or more messages or command for switching SRS carrier(s) from one or more serving cells from the first network node. Also for example in such embodiments the UE may receive one or more messages for SRS switching of one or more serving cells from the PCell.

In some embodiments, any combination of the first, second, third and fourth network nodes are different and may be located at different sites or location or may be logically different nodes that may still be co-located. In such embodiments, the UE may receive one or more messages for SRS carrier switching from one or more serving cells from the respective serving cells.

Figure 5:
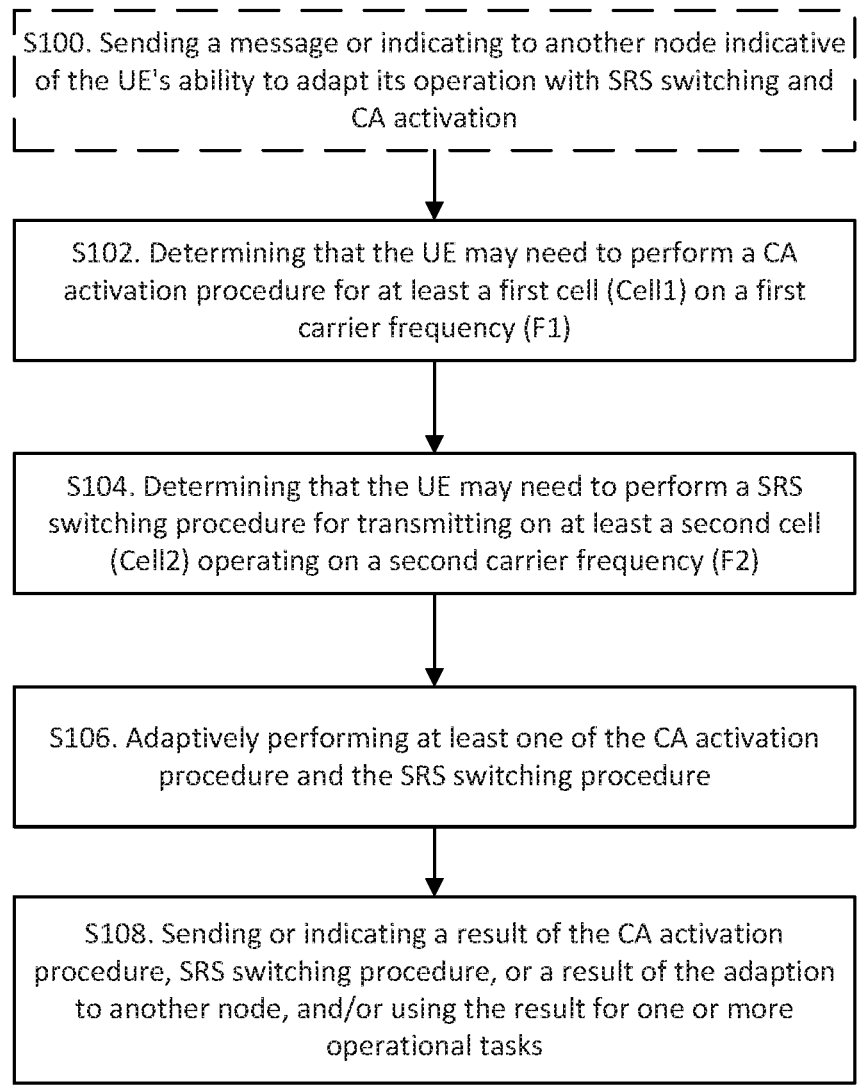
FIG. 5 is a flow chart of operations of a user equipment (UE) in accordance with some embodiments.

FIG. 5 illustrates an embodiment of a method which can be performed in a UE such as UE 110. The method may comprise:

Step S100 (in some but not necessarily all embodiments): Sending a message or indicating to another node (e.g., a network node or another UE) indicative of the UE's ability to adapt its operations with SRS switching and CA activation, e.g., in order to control one or more CA activation-related delays (e.g., SCell activation procedure, SCell deactivation procedure, PSCell addition procedure, or PSCell release procedure) within which the UE can send a valid transmission (e.g., valid CSI or PRACH preamble).

Step S102: Determining that the UE may need to perform a CA activation procedure (e.g., SCell activation procedure, SCell deactivation procedure, PSCell addition procedure, or PSCell release procedure) for at least a first cell (cell1) on a first carrier frequency (F1).

Step S104: Determining that the UE may need to perform a SRS switching procedure for transmitting (e.g., SRS or PRACH) on at least a second cell (cell2) operating on a second carrier frequency (F2).

Step S106: Adaptively performing at least one of the CA activation procedure and the SRS switching procedure.

Step S108: Sending or indicating a result of the CA activation procedure, SRS switching procedure, or a result of the adaption to another node, and/or using the result for one or more operational tasks.

It will be appreciated that one or more of the above steps may be performed simultaneously and/or in a different order. Also, steps illustrated in dashed lines are optional and may be omitted in some embodiments.

The steps will now be described in more detail.

Step S100

In this optional step, the UE may send a message or indication to another node (e.g., a network node or another UE) indicating the ability of the UE to adapt its operations with SRS switching and CA activation, e.g., in order to control one or more CA activation-related delays (e.g., SCell activation procedure, SCell deactivation procedure, PSCell addition procedure, or PSCell release procedure) within which the UE can send a valid transmission (e.g., valid CSI or PRACH preamble).

The indication may also comprise the UE's ability to operate according to one or more embodiments described herein.

The capability may be signaled, e.g., upon a request from another node or upon a triggering condition or event or receiving a certain message from another node.

Step S102

In this step, the UE may determine that the UE may need to perform a CA activation procedure for at least a first cell (cell1) on a first carrier frequency (F1), e.g., activation of a deactivated SCell, deactivation of activated SCell, addition or release of PSCell.

In some embodiments, the determining may further comprise determining that the UE may need to transmit a valid transmission within a delay associated with the CA activation procedure. For example, the UE may need to transmit a valid measurement report (e.g., CSI report) after the activation procedure has been triggered (e.g., upon receiving SCell activation command or upon a triggering condition or event). In another example, the UE may need to transmit a valid PRACH preamble after the activation procedure has been triggered (e.g., upon receiving PSCell addition command or upon a triggering condition or event).

In some embodiments, the determining may further comprise determining that the UE may need to receive a signal/channel in DL in order to transmit a valid transmission within a delay associated with the CA activation procedure. For example, in order to transmit a valid measurement report (e.g., CSI), the UE may need to receive certain signals/channels in DL for the measurement. In another example, if the UE has no valid TA (timing advance) for transmitting in UL a valid measurement report, the UE may need to also obtain a valid timing (e.g., wait for a TA command or determine the timing based on a reference) prior to the transmission; obtaining a valid timing may also comprise sending PRACH to enable receiving TA command from a network node.

In either case, the determining may be based, e.g., on one or more of:

A message (e.g., request, command, trigger, etc.) or indication received from another node (e.g., UE or another network node);

A pre-defined procedure (e.g., it may be predefined which measurement report the UE is expected to send as well as a sequence of minimum UE actions the UE needs to take);

A pre-defined rule;

A pre-defined requirement;

A triggering event or condition;

A timer or counter (e.g., upon expiration triggering the activation procedure);

A result of the CA activation procedure (e.g., success of failure; in case of a failure no need to transmit a valid measurement result);

Determining whether there is valid transmission timing for an UL transmission such as valid measurement report transmission (e.g., if not, the UE needs to determine the timing which may comprise determining based on a certain reference DL signals or transmitting PRACH to enable receiving TA in response to it);

Determining availability of UL resources for the valid measurement report transmission (if not available, the UE needs to obtain the resources which may further involve sending and/or receiving signals/channels unless the UE can determine the resources autonomously or based on a pre-defined rule).

Step S104

In this step, the UE may determine the need to perform a SRS switching procedure for transmitting (e.g., SRS or PRACH) on at least a second cell (cell2) operating on a second carrier frequency (F2).

The determining may be based on one or more of:

UE activity state (e.g., SRS switching only in non-DRX state or short DRX state, but not in eDRX or not in DRX);

SRS switching type;

SRS switching configuration;

A message, trigger or an indication, indicative of the need to perform the SRS carrier based switching, received from a higher layer in the first node or from another node (e.g., a network node or another UE);

Transmission (e.g., SRS and/or PRACH) configuration associated with SRS switching;

Event, condition, or a trigger according to which the SRS carrier based switching needs to be performed;

A timer in the first node indicating that the SRS carrier based switching needs to be performed (e.g., for periodic or scheduled measurements);

A time- and/or frequency-domain pattern controlling when the SRS carrier based switching is to be performed and which frequency resources (e.g., carriers) are involved;

SRS (re)configuration for the SRS transmissions to start in relation to the SRS carrier based switching;

SRS (re)configuration for the SRS transmissions to stop in relation to the SRS carrier based switching;

Scheduling of signals in the UL and/or in the DL to the UE in cell2;

Estimation of UL and/or DL signal quality in cell2;

Estimation of timing between the UE and cell2 e.g. round trip time, timing advance, etc.;

Positioning of the UE.

SRS switching configuration may further comprise, e.g., one or more of:

SRS switching period (i.e., time after which the UE switch to another carrier to transmit SRS);

Number or a set of carriers involved in SRS carrier based switching;

Sequence in which the carriers are switched;

SRS switching loop length (e.g., the time to the next transmission on the same carrier);

SRS transmission configuration (see e.g. SRS transmission parameters as described in the background section);

PRACH configuration (e.g., configuration index, preamble format, etc.);

Time and/or frequency resources for the transmission;

Time-to-stay on the carrier during SRS carrier based switching;

Minimum or maximum time before SRS transmission on the SRS switching target carrier frequency;

Minimum or maximum time after the SRS transmission on the SRS switching source carrier frequency;

A list of carriers from which the UE can switch and/or a list of carriers to which the UE can switch;

etc.

Step S106

In this step, the UE may adaptively perform at least one of the CA activation procedure and the SRS switching procedure.

In some embodiments, the UE may adapt only SRS switching to completely avoid any impact of SRS switching on CA activation procedure. One example of adaptation of the SRS switching comprises delaying the SRS switching until the ongoing CA activation procedure for cell1 is completed. Another example of adaptation of the SRS switching comprises performing the SRS switching until before starting the CA activation procedure for cell1. In this case the UE may meet the CA activation requirements (e.g. CA activation delay (T0)) which are to be met when the UE is not configured for SRS switching.

In some embodiments, the UE may partly adapt SRS switching and also adapt CA activation procedure to at least partly avoid any impact of SRS switching on CA activation procedure. One example of partial adaptation of the SRS switching comprises performing least possible number of times the SRS switching during the CA activation procedure. In this case the UE may meet partially extended CA activation requirements (e.g. CA activation delay (T1)) where T1>T0.

In some embodiments, the UE may not adapt the SRS switching while adapting the CA activation procedure. For example, the SRS switching may be performed regardless of the impact on the CA activation procedure. In this case the UE may meet extended or relaxed CA activation requirements (e.g. CA activation delay (T2)) where T2>T1. In order to meet the extended CA activation requirements, the UE may have to adapt the CA activation procedure.

In some embodiments, the UE may not adapt the SRS switching while adapting the CA activation procedure provided that no more than N1 number of SRS switching operations occur during the extended CA activation time or delay requirements (T2). For example, if the number of SRS switching operations performed by UE during T2 over which the UE is also performing the CA activation procedure, is greater than N1 then the UE may abort the ongoing CA activation procedure. In this case the UE may also inform the network node that it has aborted the CA activation procedure.

In some embodiments, the UE may adapt the SRS switching such that no more than N2 number of SRS switching operations occur during the basic CA activation time or delay requirements (e.g. T0). For example, if the number of SRS switching operations performed by UE during T0 over which the UE is also performing the CA activation procedure, is not greater than N2 then the UE may perform the ongoing CA activation procedure during T0.

In some embodiments, the UE may adapt the SRS switching such that no more than N3 number of SRS switching operations occur during the extended CA activation time or delay requirements (e.g. T3). For example, if the number of SRS switching operations performed by UE during T2 over which the UE is also performing the CA activation procedure, is not greater than N3 then the UE may perform the ongoing CA activation procedure during T3.

In some embodiments, the UE may selectively adapt the SRS switching such that no SRS switching operations occur during certain specific time resources or specific signals within the CA activation time or delay requirements (e.g. T0). Examples of specific time resources or signals are those used for specific operations such as subframe #0 and subframe #5 containing PSSS/SSS, subframes with random access opportunity, etc. In one example, if the SRS switching operations performed by UE during T0 do not affect the specific signals or time resources but may affect other signals then the UE may perform the CA activation procedure within an extended time period. In another example if the SRS switching operations performed by UE during T0 do not affect the specific signals or time resources but may affect the other signals then the UE may perform the CA activation procedure within T4 where T4>T0.

In the above examples the UE may have to extend the CA activation time or abort the CA activation procedure because the SRS switching may cause interruption to certain time resources or signals (e.g. PSS, SSS, CRS, random access, etc.) of cell1 in UL and/or DL at the UE. Such resources or signals are used by the UE for one or more operations related to CA activation procedure e.g. processing of activation command or message, reconfiguration of bandwidth, random access synchronization to cell1, acquisition of AGC of cell1 etc. The loss of such signals would require the UE to restart the operations affected by the loss of such signals in order to complete the CA activation procedure.

In some embodiments, the UE may further obtain a performance characteristic, a requirement or a target associated with the delay associated with the CA activation procedure. The obtaining may be based, e.g., on a pre-defined rule, requirement, table, message or indication received from another node (a performance target or measurement period or maximum allowed interruption is indicated via RRC), etc. Examples of performance characteristic/target/requirement: activation delay of one or more deactivated SCells, deactivation of one or more activated SCells, PSCell addition delay, PSCell release delay, etc.

In some embodiments, the UE may further adapt at least one of the CA activation procedure and SRS switching configuration or procedure, based on the obtained performance characteristic, requirement or target. For example, the adaptation may be performed to meet a performance requirement.

In some embodiments, the UE may further perform a transmission (e.g., measurement reporting transmission or PRACH transmission) associated with CA activation procedure.

In some embodiments, the UE may determine time and/or frequency resources R1 (e.g., DL and/or UL) associated with the CA activation procedure.

In some embodiments, the UE may determine time and/or frequency resources R2 associated with the SRS switching.

In some embodiments, the UE may determine time and/or frequency resources R1* on F1 impacted by the SRS switching and by the related transmissions (e.g., SRS and PRACH).

The adaptation may comprise, e.g., adapting one or more of:
  SRS switching configuration;
  Transmission(s) configuration (e.g., SRS or PRACH) associated with SRS switching;
  CA activation procedure.

The adaptation may further comprise, e.g., any one or more of:
  Adapting based on one or more priorities between SRS switching and CA activation procedure (e.g., transmission priorities, performance priorities, etc.);
  Adapting of time and/or frequency resources associated with:
    SRS switching;
    transmissions related to SRS switching;
    receptions related to SRS switching (e.g., for acquiring timing for the transmissions related to SRS switching);
    transmissions related to CA activation procedure;
    receptions related to CA activation procedure (e.g., for acquiring timing for the transmissions related to SRS switching or for performing a measurement to be able to report a valid measurement report).
  Adapting SRS switching configuration and related transmissions configurations and/or adapting the time of triggering the CA activation procedure to avoid interruption due to SRS switching in specific subframes during the CA activation procedure, e.g.:
    During the time before subframe n+5 and not after subframe n+9 when PCell belongs to E-UTRA FDD; or
    During the time before subframe n+5 and not after subframe n+11 when PCell belongs to E-UTRA TDD;
    Where n is the subframe of receiving activation/deactivation command or triggering the CA activation procedure.
  Adapting a configuration parameter for SRS switching;
  Adapting a configuration parameter for the transmission associated with SRS switching;
  Adapting a configuration parameter for the transmission (e.g., measurement reporting transmission such as CSI or PRACH transmission) associated with the CA activation procedure;
  Adapting timing acquisition procedure associated with the CA activation procedure;
  Postponing/delaying/increasing the time of/compromising the accuracy of receiving signals/channels in relation to the CA activation procedure;
  Dropping/skipping/postponing/delaying/performing earlier/resuming SRS switching and/or associated transmission;
  Dropping/skipping/postponing/delaying/performing earlier/resuming/retransmitting/rescheduling a transmission associated with the CA activation procedure;
  Postponing/delaying/resuming/retransmitting/rescheduling a transmission associated with the CA activation procedure with certain delay e.g. after L1 number time resources;
  Aborting the transmission associated with CA activation procedure if it cannot be delivered after L2 number of interruptions due to SRS switching;
  Transmitting the transmission associated with CA activation procedure on a carrier different from F1;
  Selecting a carrier for transmitting the transmission associated with CA activation procedure, e.g., between F1 and another carrier, to minimize the impact of SRS switching;
  Misaligning in time (e.g., by adapting periodicity, scheduling in time, any of the above, etc.) of the resources R1* and R1, e.g., allowing at least time T or N time resources between R2 and R1 (in a special case, T and N can be zero, i.e. adjacent R2 and R1);
  Ensuring that no more than X of R1 resources overlap with R1*;
  Ensuring that no more than X % of R1 resources overlap with R1*;
  Ensuring that no more than Y % of R1* resources overlap with R1;
  Ensuring that the total amount of interruption impact on cell1 (including the interruptions due to SRS switching) is below a threshold or the interruption probability does not exceed a threshold;
  Increasing the number of UL response transmission attempts if at least some overlap of R1 and R2 occurs;
  Increasing reliability or robustness (e.g., adapting MCS and/or Tx power) of the UL transmission (related to CA activation procedure) attempts to compensate for the reduced number of transmission attempts due to the SRS switching impact;
  Adapting the transmit power of transmissions related to SRS switching and/or transmissions related to CA activation delay, e.g., reducing the transmit power of one or both of SRS switching related transmission and CA activation related transmission to ensure that the sum transmit power does not exceed a threshold or the UE transmission capability.

The adapted configuration(s) of SRS switching, SRS switching related transmission and/or CA activation related transmission may be obtained based, e.g., on a pre-defined rule, requirement, table, message or indication received from another node, etc.

The adaption is performed in order to control (e.g., avoid, reduce, or minimize) the impact of SRS carrier based switching (e.g., interruption impact or the impact of sharing the transmitter or other UE resources) on CA activation procedure. The adaptation may also be performed to achieve a trade-off between SRS switching related performance and CA activation procedure (e.g., no degradation on both or some limited degradation for both may be accepted). The adaptation may also be performed to control (e.g., avoid, reduce, or minimize) the impact of CA activation procedure on SRS switching performance. The adaptation may also be based on priorities between SRS switching and CA activation procedure (e.g., transmission priorities, performance priorities, etc.).

The adaptation may be used to maintain UE performance and/or ensure that the UE is able to meet corresponding requirements.

Specific Examples of Adaptation

SCell Activation Delay

Upon receiving SCell activation command in subframe n, the UE should be capable to transmit valid CSI report for the SCell being activated no later than in subframe n+24+m, where m depends on the impact of SRS switching and related transmissions (e.g., m=0 if the impact can be avoided by the adaptation), if the SCell is known. If the SCell is unknown, the UE should be able to transmit valid CSI report for the SCell being activated no later than in subframe n+34+m.

SCell Activation Delay with Multiple DL SCells

While activating a SCell if any other SCell is activated, deactivated, configured or deconfigured by the UE then the UE should meet the SCell activation delay requirements ($T_{activate\_total}$) according to the following expression:

$$T_{activate\_total} = T_{activate\_basic} + 5 \times \sum_{i=1}^{N-1} K_i$$

where:

$T_{activate\_total}$ is the total time to activate a SCell and is expressed in subframes;

$T_{activate\_basic}$ is the SCell activation delay for one cell which may depend on the impact of SRS switching and related transmissions;

$K_i$ ($0 \leq K_i \leq [3]+k$) is the number of times the other $i^{th}$ SCell is activated, deactivated, configured or deconfigured while the SCell is being activated, where k may or may not be 0 with SRS switching (>0 if additional activation due to SRS switching is allowed without comprising on activation occasions; otherwise it may be 0);

N ($2 \leq N \leq 4$) is the maximum number of SCells supported by the UE.

In another example, $$T_{activate\_total} = T_{activate\_basic} + 5 \times \sum_{i=1}^{N-1} K_i + f\left(\sum_{i=1}^{M-1} S_i\right)$$

where $S_i$ is the number of SRS switching times for cell i, during the SCell is being activated, in relation to SRS switching or the number of times the switching occurs to and/or from the $i^{th}$ SCell;

M is the number of SCells involved in SRS switching.

In another example, the interruptions due to SRS switching may also need to be completely avoided before subframe n+n1 (e.g., n1=5) and not occur after subframe n+n2 (e.g., n2=9 or 11, depending on frame structure and duplex mode).

Activation of SCell with Configured PUCCH

If the UE has a valid TA for transmitting on an SCell then the UE should be able to transmit valid CSI report and activate the SCell no later than in subframe n+$T_{activate\_basic}$, where $T_{activate\_basic}$ is the delay corresponding to the delay of SCell activation without PUCCH which may depend on the impact of SRS switching.

If the UE does not have a valid TA for transmitting on an SCell then the UE shall be capable to complete SCell activation no later than n+$T_{delay\_PUCCH\_SCell}$, where $$T_{delay\_PUCCH\_SCell} = f0(T_{activate\_basic}, T_{srs0}) + f1(T_1, T_{srs1}) + f2(T_2, T_{srs2}) + f3(T_3, T_{srs3})$$

where:

$T_1$ is the delay uncertainty in acquiring the first available PRACH occasion in the PUCCH SCell. $T_1$ is up to 25 subframes and the actual value of $T_1$ shall depend upon the PRACH configuration used in the PUCCH SCell.

$T_2$ is the delay for obtaining a valid TA command for the sTAG to which the SCell configured with PUCCH belongs. $T_2$ is up to 13 subframes.

$T_3$ is the delay for applying the received TA for uplink transmission. $T_3$ is 6 subframes.

$T_{srs0}$, $T_{srs1}$, $T_{srs2}$, $T_{srs3}$ are the additional delays due to SRS switching and related SRS transmissions, and of these additional delays may also be zero in special cases when the impact can be completely avoided by means of adaptation.

PSCell Addition Delay

Upon receiving PSCell addition in subframe n, the UE should be capable to transmit PRACH preamble towards PSCell no later than in subframe n+$T_{config\_PSCell}$:

where:

$T_{config\_PSCell}$=f($T_{activation\_time}$, uncertaintyDelays, additionalMargins);

$T_{activation\_time}$ is the PSCell activation delay, which may further depend on whether the PSCell is known or unknown, and if it is unknown whether it can be successfully detected on the first N (e.g N=1) attempts;

uncertaintyDelays may comprise e.g.:
delay due to uncertainty in PRACH preamble transmission which may in turn depend on the impact of SRS switching (e.g., interruption impact or Tx power limit or the number of simultaneous UL transmissions over multiple carriers);

delay due to uncertainty in acquiring the first available PRACH occasion in the PSCell, which may in turn depend on the impact of SRS switching (e.g., interruption impact during the acquiring, etc.).

SCell Activation Delay for Frame Structure 3

Upon receiving SCell activation command in subframe n, the UE should be capable to transmit valid CSI report and apply actions related to the activation command for the SCell being activated no later than in subframe n+$T_{activate\_basic\_FS3}$:

$T_{activate\_basic\_FS3}$=g($T_{DMTC\_duration}$, L, $N_{srs}$, Mg, $T_{DMTC\_periodicity}$)

where:

$T_{DMTC\_duration}$=6 ms is the DMTC duration;

$T_{DMTC\_periodicity}$ is the periodicity of the DMTC;

Mg=implementation margin to account for UE implementation and uncertainty. As special case Mg can be neglected or set to zero;

$N_{srs}$: is the number of times SRS switching operation occurs during the SCell activation time;

L is the number of times the discovery signal occasion is not available at the UE during the SCell activation time.

An example of function g(·) when the SCell is known (e.g. synchronized) to the UE is given below:

$$T_{activate\_basic\_FS3} = 16 \text{ ms} + T_{DMTC\_duration}(L+2+N_{srs}) * T_{DMTC\_periodicity}$$

Another example of function g(·) when the SCell is not known (e.g. unsynchronized) to the UE is given below:

$$T_{activate\_basic\_FS3} = 16 \text{ ms} + T_{DMTC\_duration} + (L+3+N_{srs}) * T_{DMTC\_periodicity}$$

Step S108

In this step, the UE may send or indicate a result of the CA activation procedure, SRS switching procedure, or a result of the adaptation to another node (e.g., another UE, network node, radio network node, core network node, positioning node, etc.) or use the result for one or more operational tasks.

The result of the adaptation, result of CA activation procedure, or result of SRS switching procedure may be any result (e.g., measurement result, interruption count, positioning calculation, link adaptation, power control, performance characteristic, success/failure of the procedure, etc.) obtained after applying the adaptation or characterizing the adaptation, CA activation, or SRS switching.

Examples of the operational tasks:

Informing another node (e.g. network node) that the adaptation has been/is/will be performed by the UE;

Informing another node (e.g. network node) that the adaptation has been/is/will be performed to avoid the impact on measurements on specific carrier frequencies e.g. F1;

Positioning, RRM, MDT, mobility, SON, resource optimization.

Figure 6:
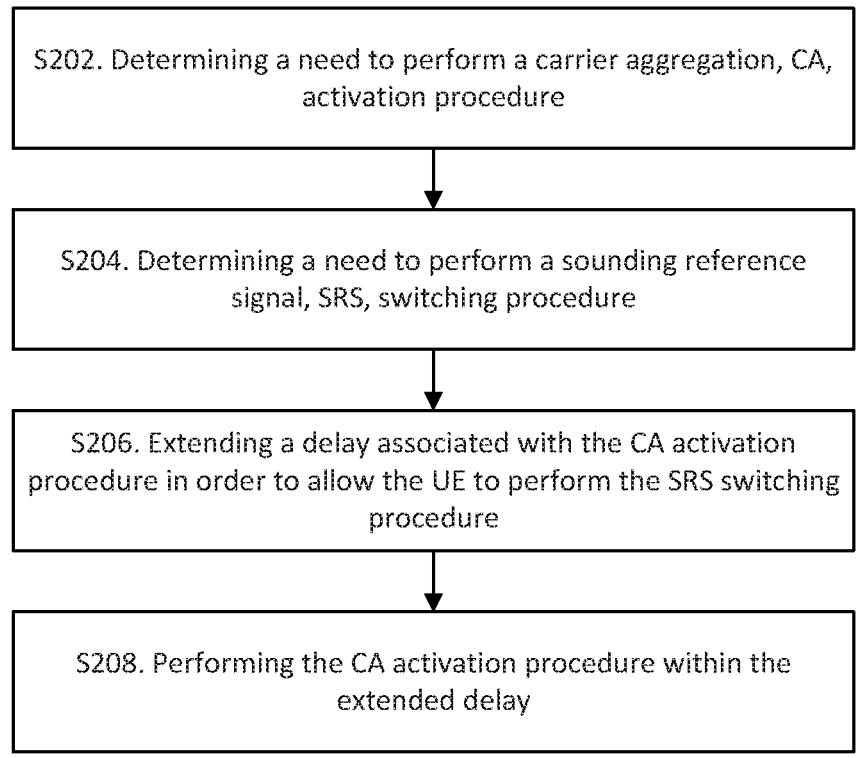
FIG. 6 is another flow chart of operations of a user equipment (UE) in accordance with some embodiments.

FIG. 6 illustrates another embodiment of a method which ca be performed in a UE such as UE 110. The method illustrated in FIG. 6 includes some rearrangements of steps and elements previously described (e.g., with respect to FIG. 5). The method may comprise:

Step S202: Determining a need to perform a carrier aggregation (CA) procedure.

Step S204: Determining a need to perform a sounding reference signal (SRS) switching procedure.

Step S206: Extending a delay associated with the CA activation procedure in order to allow the UE to perform the SRS switching procedure.

Step S208: Performing the CA activation procedure within the extending delay.

It will be appreciated that one or more of the above steps may be performed simultaneously and/or in a different order. Also, steps illustrated in dashed lines are optional and may be omitted in some embodiments.

The steps will now be described in more detail.

Step S202

In this step, the UE determines that it needs to perform a CA activation procedure. As indicated above, the CA activation procedure may comprise the activation or the deactivation of one or more SCells, the addition or the release of a PSCell, etc. In some embodiments, the UE may determine that it needs to perform the CA activation procedure upon receiving a message from a radio network node (e.g., radio network node 130), the message comprising instructions or commands to perform the CA activation procedure.

When the CA activation procedure is the activation of an SCell or the deactivation of an SCell, the message received from the radio network node may be a medium access control (MAC) message. In some embodiments, the MAC message may comprise a control element (CE) comprising an SCell activation command (when the CA activation procedure is the activation of an SCell) or an SCell deactivation command (when the CA activation procedure is the activation of an SCell).

When the CA activation procedure is the addition of a PSCell or the release of a PSCell, the message received from the radio network node may be a radio resource configuration (RRC) message 152. In some embodiments, the RRC message 152 may comprise a pSCellToAddMod field 154.

Step S204

In step S204, the UE determines the need to perform a SRS switching procedure. In some embodiments, the UE may determine the need to perform the SRS switching procedure by receiving a request from a radio network node (e.g., radio network node 130). The request may be an SRS request carried by a downlink control information message. In some embodiments, the UE may determine the need to perform the SRS switching procedure upon the occurrence of one or more predetermined events (e.g., the expiration of a timer).

Step S206

In step S206, the UE extends the delay associated with the CA activation procedure in order to allow the UE to perform the SRS switching procedure. In some embodiments, the UE may extend the delay associated with the CA activation procedure upon determining the need to perform the SRS switching procedure after having determined the need to perform the CA activation procedure. In other words, in some embodiments, the UE initially determines the need to perform the CA activation procedure, then determines the need to perform the SRS switching procedure, and only then proceeds to extend the delay associated with the CA activation procedure.

Extending the delay associated with the CA activation procedure may comprise going beyond the delay normally associated with a given CA activation procedure in order for the UE to perform (and complete) the SRS switching procedure. Typically, CA activation procedures have delays associated with them for the completion of the procedure. For instance, according to 3GPP TS 36.133, version 14.1.0, the delay normally associated with an SCell activation procedure is n+24 subframes (when the identity of the SCell to be added is known) or n+34 subframes (when the identity of the SCell to be added is not known). Hence, in such a case, extending the delay associated with the CA activation procedure would mean the UE extending the delay to perform the SCell addition beyond the delay, i.e., n+24 subframes or n+34 subframes, normally associated with SCell additions. In some embodiments, as described above, the UE may extend the delay for a predetermined amount of time, e.g., m subframe beyond the normal delay. In some embodiments, the UE may extend the delay as long as necessary for the performance and completion of the SRS switching procedure.

Step S208

In this step, the UE performs the necessary actions to complete the CA activation procedure. Understandably, different CA activation procedures may require different actions. For instance, activating a SCell may comprise activating the SCell, performing measurement on the activated SCell and reporting the measurement via a CSI report. For the addition of a PSCell, the UE may perform a random access on the PSCell.

Figure 7:
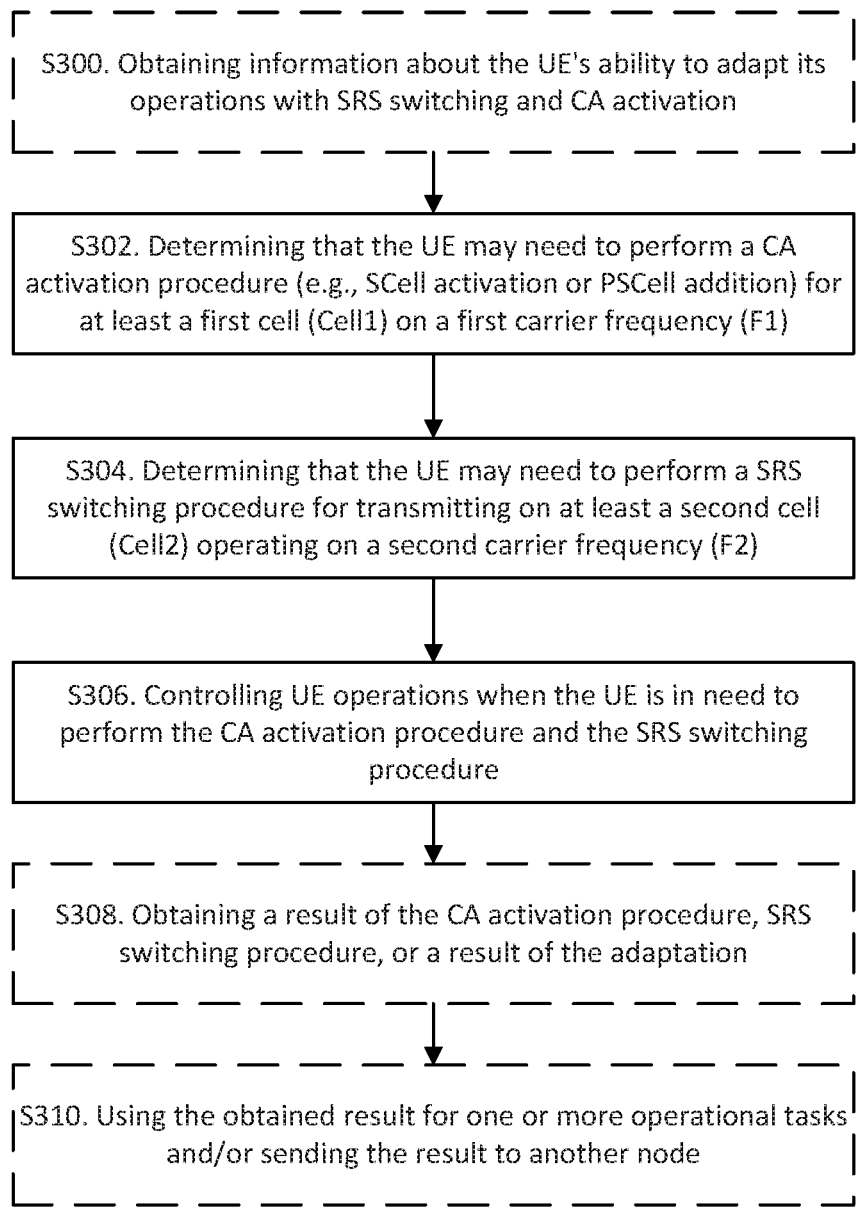
FIG. 7 is a flow chart of operations of a radio network node in accordance with some embodiments.

FIG. 7 illustrates an embodiment of a method which can be performed in a network node such as radio network node 130. The method may comprise:

Step S300 (in some but not necessarily all embodiments): Obtaining information about the UE's ability to adapt its operations with SRS switching and CA activation.

Step S302: Determining that the UE may need to perform a CA activation procedure (e.g., SCell activation or PSCell addition) for at least a first cell (Cell1) on a first carrier frequency (F1).

Step S304: Determining that the UE may need to perform a SRS switching procedure for transmitting (e.g., SRS or PRACH) on at least a second cell (Cell2) operating on a second carrier frequency (F2).

Step S306: Controlling UE operations, when the UE is in need to perform the CA activation procedure and the SRS switching procedure.

Step S308 (optional): Obtaining a result of the CA activation procedure, SRS switching procedure, or a result of the adaptation.

Step S310 (optional): Using the obtained result for one or more operational tasks and/or sending the result to another node.

It will be appreciated that one or more of the above steps may be performed simultaneously and/or in a different order. Also, steps illustrated in dashed lines are optional and may be omitted in some embodiments.

The steps will now be described in more detail.

Step S300

The network node may obtain the UE's capability based on, e.g., receiving a message from the UE or another node, monitoring UE behavior, etc.

The network node may also send a request for such capability.

Step S302

In this step, the network node may determine that the UE may need to perform a CA activation procedure (e.g., SCell activation or PSCell addition) for at least a first cell (Cell1) on carrier frequency (F1).

In some embodiments, the determining may further comprise determining that the UE may need to transmit a valid transmission within a delay associated with the CA activation procedure.

In some embodiments, the determining may further comprise determining that the UE may need to receive a signal/channel in DL in order to transmit a valid transmission within a delay associated with the CA activation procedure.

Methods for determining may be similar to those described above for the UE. In addition, the determining may be based on determining the need to transmit and/or receive some data by the UE on F1 (e.g., scheduling, load balancing, etc.).

Step S304

In this step, the network node determines that the UE may need to perform a SRS switching procedure for transmitting (e.g., SRS or PRACH) on at least a second cell (Cell2) operating on a second carrier frequency (F2).

The determining may be based, e.g., on SRS switching configuration, obtained UE's capability or capability to support SRS switching, request sent to the UE to perform SRS switching, etc.

Step S306

In this step, the network node may control UE operations, when the UE is in need to perform the CA activation procedure and the SRS switching procedure.

In some embodiments, the controlling may further comprise obtaining a performance characteristic, a requirement or a target associated with the delay associated with the CA activation procedure.

In some embodiments, the controlling may further comprise adapting at least one of the CA activation procedure and the SRS switching configuration or procedure, based on the obtained performance characteristic, requirement or target.

In some embodiments, the controlling may further comprise adaptively controlling UE transmission timing acquisition for CA activation and/or SRS switching. For example, adapting the transmission of the TA command (e.g., transmitting earlier or transmitting in resources not interrupted by SRS switching, etc.).

In some embodiments, the controlling may further comprise adapting transmission configuration of radio signals/channels to be received by the UE for being able to transmit a valid measurement report. For example, to ensure enough transmissions in resources not impacted by SRS switching.

The controlling may further comprise sending a message, an indication, a parameter, a configuration, or a request to the UE.

Examples of adaptation include:
Adapting the measurement configuration and transmitting the adapted measurement configuration to the UE;
Adapting scheduling of signals/channels/messages in the uplink and/or in the downlink;
Changing the sets of or swapping carrier frequencies of PCell, PSCell and/or SCells of the UE;
Adapting SRS configuration e.g. periodicity and/or bandwidth of the SRS.

Step S308

In this step, the network node may obtain (e.g., receive from the UE or determine based on measurements) a result of the CA activation procedure, the SRS switching procedure, or a result of the adaptation.

Step S310

In this step, the network node may use the obtained result for one or more operational tasks (positioning, RRM, MDT, mobility, SON, resource and scheduling optimization) and/or send the result to another node.

Exemplary Standardization Embodiment

In some embodiments, the following sections of 3GPP TS 36.133 v14.1.0 may be modified as follows to enable one or more of the described embodiments.

=====<<<<<<TS 36.133>>>>>>=====

7.7 SCell Activation and Deactivation Delay for E-UTRA Carrier Aggregation 7.7.1 Introduction This section defines requirements for the delay within which the UE shall be able to activate a deactivated SCell and deactive an activated SCell in E-UTRA carrier aggregation. The requirements are applicable to an E-UTRA carrier aggregation capable UE which has been configured with up to four downlink SCells.

If multiple downlink SCells are activated or deactivated in the same MAC control element as defined in [17], the requirements shall apply to each of the SCells in the MAC control element.

7.7.2 SCell Activation Delay Requirement for Deactivated SCell

The requirements in this section shall apply for the UE configured with one downlink SCell. The requirements in this section are applicable for E-UTRA FDD, E-UTRA TDD and E-UTRA TDD-FDD carrier aggregation.

The delay within which the UE shall be able to activate the deactivated SCell depends upon the specified conditions.

Upon receiving SCell activation command in subframe n, the UE shall be capable to transmit valid CSI report and apply actions related to the activation command as specified in [17] for the SCell being activated no later than in subframe n+24 provided the following conditions are met for the SCell:

During the period equal to max(5 measCycleSCell, 5 DRX cycles) before the reception of the SCell activation command:
the UE has sent a valid measurement report for the SCell being activated and
the SCell being activated remains detectable according to the cell identification conditions specified in section 8.3.3.2,
SCell being activated also remains detectable during the SCell activation delay according to the cell identification conditions specified in section 8.3.3.2.

Otherwise upon receiving the SCell activation command in subframe n, the UE shall be capable to transmit valid CSI report and apply actions related to the activation command as specified in [17] for the SCell being activated no later than in subframe n+34 provided the SCell can be successfully detected on the first attempt.

If there is no reference signal received for the CSI measurement over the delay corresponding to the minimum requirements specified above, then the UE shall report corresponding valid CSI for the activated SCell on the next available uplink reporting resource after receiving the reference signal.

The SCell activation delay specified in this section can be extended if SRS carrier based switching occurs during the SCell activation procedure.

If there are no uplink resources for reporting the valid CSI in subframe n+24 or n+34 or uplink transmission is interrupted due to SRS carrier based switching for reporting the valid CSI in subframe n+24 or n+34 then the UE shall use the next available uplink resource for reporting the corresponding valid CSI.

The valid CSI is based on the UE measurement and corresponds to any CQI value specified in [3] with the exception of CQI index=0 (out of range) provided:
the conditions in section 7.7 are met over the entire SCell activation delay and
the conditions for CQI reporting defined in Section 7.2.3 of [3] are met.

In addition to CSI reporting defined above, UE shall also apply other actions related to the activation command specified in [17] for an SCell at the first opportunities for the corresponding actions once the SCell is activated.

The PCell interruption specified in section 7.8.2 shall not occur before subframe n+5 and not occur after subframe n+9 when PCell belongs to E-U IRA FDD.

The PCell interruption specified in section 7.8.2 shall not occur before subframe n+5 and not occur after subframe n+11 when PCell belongs to E-UTRA TDD.

Starting from the subframe specified in section 4.3 of [3] and until the UE has completed the SCell activation, the UE shall report CQI index=0 (out of range) if the UE has available uplink resources to report CQI for the SCell.

7.7.6 SCell Activation Delay Requirement for Deactivated PUCCH SCell

The requirements in this section shall apply for the UE configured with one downlink SCell and when PUCCH is configured for the SCell being activated.

If the UE has a valid TA for transmitting on an SCell then the UE shall be able to transmit valid CSI report and apply actions related to the SCell activation command as specified in [17] for the SCell being activated on the PUCCH SCell no later than in subframe $n+T_{activate\_basic}$:

Where:
A TA is considered to be valid provided that the TimeAlignmentTimer [2] associated with the TAG containing the PUCCH SCell is running
$T_{activate\_basic}$ is the SCell activation delay as defined in section 7.7.2.

If the UE does not have a valid TA for transmitting on an SCell then the UE shall be capable to perform downlink actions related to the SCell activation command as specified in [17] for the SCell being activated on the PUCCH SCell no later than in subframe $n+T_{activate\_basic}$ and shall be capable to perform uplink actions related to the SCell activation command as specified in [17] for the SCell being activated on the PUCCH SCell no later than in subframe $n+T_{delay\_PUCCH}$ SCell and shall transmit valid CSI report for the SCell being activated on the PUCCH SCell no later than in subframe $n+T_{delay\_PUCCH\ SCell}$, where:

$$T_{delay\_PUCCH\ SCell} = T_{activate\_basic} + T_1 + T_2 + T_3$$

Where:
$T_1$ is the delay uncertainty in acquiring the first available PRACH occasion in the PUCCH SCell. $T_1$ is up to 25 subframes and the actual value of $T_1$ shall depend upon the PRACH configuration used in the PUCCH SCell.
$T_2$ is the delay for obtaining a valid TA command for the sTAG to which the SCell configured with PUCCH belongs. $T_2$ is up to 13 subframes.
$T_3$ is the delay for applying the received TA for upling transmission. $T_3$ is 6 subframes.
The above delay requirement ($T_{delay\_PUCCH\ SCell}$) shall apply provided that:
The UE has received a PDCCH order to initiate RA procedure on the PUCCH SCell within $T_{activate\_basic}$ otherwise additional delay to activate the SCell is expected; and
The RA on PUCCH SCell is not interrupted by the RA on PCell otherwise additional delay to activate the SCell is expected.
No SRS carrier based switching occurs during the SCell activation procedure otherwise the PUCCH SCell activation delay ($T_{delay\_PUCCH\ SCell}$) can be extended.
The interruption on the PCell specified in section 7.8.2 shall meet all applicable requirements in clause 7.7.2.

7.14 PSCell Addition and Release Delay for E-UTRA Dual Connectivity 7.14.1 Introduction This section defines requirements for the delay within which the UE shall be able to configure a PSCell in E-UTRA dual connectivity. The requirements are applicable to an E-UTRA dual connectivity capable UE. The requirements shall apply for E-UTRA FDD, E-UTRA TDD and E-UTRA TDD-FDD dual connectivity.

7.14.2 PSCell Addition Delay Requirement

The requirements in this section shall apply for the UE configured with only PCell.

Upon receiving PSCell addition in subframe n, the UE shall be capable to transmit PRACH preamble towards PSCell no later than in subframe $n+T_{config\_PSCell}$:

Where:

$T_{config\_PSCell}=20$ ms$+T_{activation\_time}+50$ ms$+TP_{CellDU}+T_{PSCell\_DU}$ $T_{activation\_time}$ is the PSCell activation delay. If the PSCell is known, then $T_{activation\_time}$ is 20 ms. If the PSCell is unknown, then $T_{activation\_time}$ is 30 ms provided the PSCell can be successfully detected on the first attempt.

$T_{PCell\_DU}$ is the delay uncertainty due to PCell PRACH preamble transmission. $T_{PCell\_DU}$ is up to 20 ms if PSCell activation is interrupted by a PCell PRACH preamble transmission, otherwise it is 0.

$T_{PSCell\_DU}$ is the delay uncertainty in acquiring the first available PRACH occasion in the PSCell. $T_{PSCell\_DU}$ is up to 30 ms.

PSCell is known if it has been meeting the following conditions:

During the last [5] seconds before the reception of the PSCell configuration command:
the UE has sent a valid measurement report for the PSCell being configured and
the PSCell being configured remains detectable according to the cell identification conditions specified in section 8.8, PSCell being configured also remains detectable during the PSCell configuration delay according to the cell identification conditions specified in section 8.8.

otherwise it is unknown. The PCell interruption specified in section 7.12 is allowed only during the RRC reconfiguration procedure [2].

The PSCell addition delay specified in this section can be extended if SRS carrier based switching occurs during the PSCell addition procedure.

======<<<<<<TS 36.133>>>>>======

Figure 8:
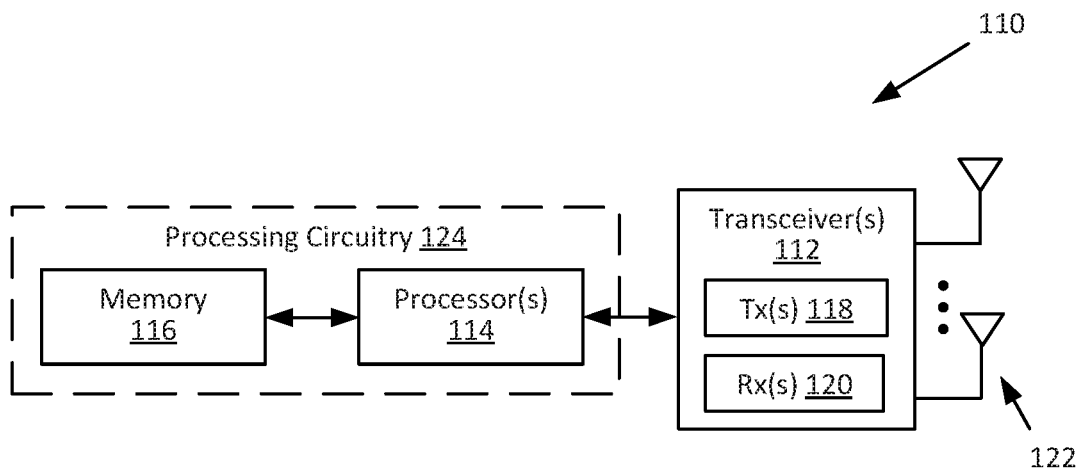
FIG. 8 is a block diagram of a user equipment (UE) in accordance with some embodiments.

FIG. 8 is a block diagram of an exemplary UE 110, in accordance with certain embodiments. UE 110 includes one or more of a transceiver 112, processor 114, and memory 116. In some embodiments, the transceiver 112 facilitates transmitting wireless signals to and receiving wireless signals from radio network node 130 (e.g., via transmitter(s) (Tx) 118, receiver(s) (Rx) 120 and antenna(s) 122). The processor 114 executes instructions to provide some or all of the functionalities described above as being provided by UE 110, and the memory 116 stores the instructions executed by the processor 114. In some embodiments, the processor 114 and the memory 116 form processing circuitry 124.

The processor 114 may include any suitable combination of hardware to execute instructions and manipulate data to perform some or all of the described functions of UE 110, such as the functions of UE 110 described above. In some embodiments, the processor 114 may include, for example, one or more computers, one or more central processing units (CPUs), one or more microprocessors, one or more application specific integrated circuits (ASICs), one or more field programmable gate arrays (FPGAs) and/or other logic.

The memory 116 is generally operable to store instructions, such as a computer program, software, an application including one or more of logic, rules, algorithms, code, tables, etc. and/or other instructions capable of being executed by a processor 114. Examples of memory 116 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor 114 of UE 110.

Other embodiments of UE 110 may include additional components beyond those shown in FIG. 8 that may be responsible for providing certain aspects of the UE's functionalities, including any of the functionalities described above and/or any additional functionalities (including any functionality necessary to support the solution described above). As just one example, UE 110 may include input devices and circuits, output devices, and one or more synchronization units or circuits, which may be part of the processor. Input devices include mechanisms for entry of data into UE 110. For example, input devices may include input mechanisms, such as a microphone, input elements, a display, etc. Output devices may include mechanisms for outputting data in audio, video and/or hard copy format. For example, output devices may include a speaker, a display, etc.

Figure 9:
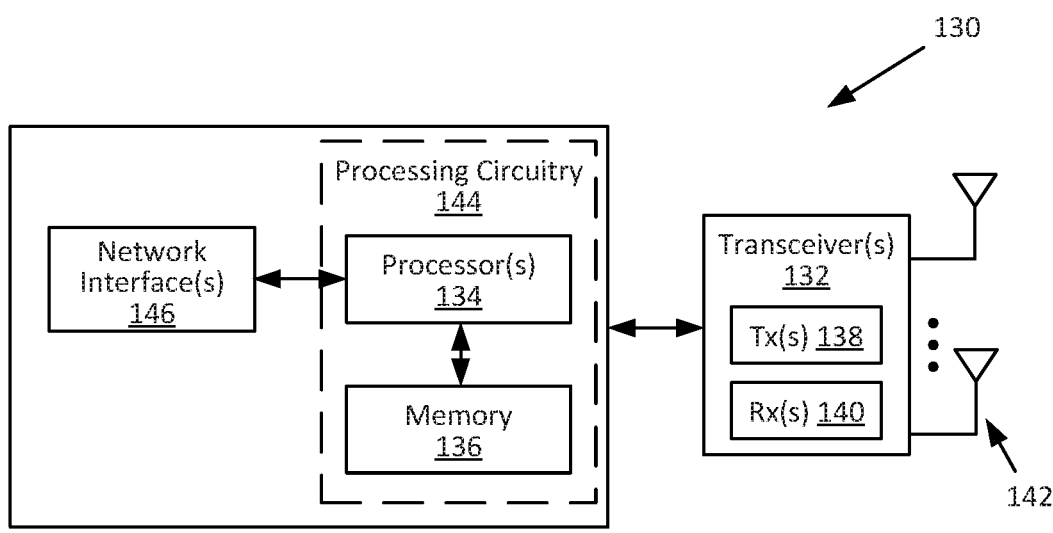
FIG. 9 is a block diagram of a radio network node in accordance with some embodiments.

FIG. 9 is a block diagram of an exemplary radio network node 130, in accordance with certain embodiments. Radio network node 130 may include one or more of a transceiver 132, processor 134, memory 136, and network interface 146. In some embodiments, the transceiver 132 facilitates transmitting wireless signals to and receiving wireless signals from UE 110 (e.g., via transmitter(s) (Tx) 138, receiver(s) (Rx) 140, and antenna(s) 142). The processor 134 executes instructions to provide some or all of the functionalities described above as being provided by a radio network node 130, the memory 136 stores the instructions executed by the processor 134. In some embodiments, the processor 134 and the memory 136 form processing circuitry 144. The network interface 146 communicates signals to backend network components, such as a gateway, switch, router, Internet, Public Switched Telephone Network (PSTN), core network nodes or radio network controllers, etc.

The processor 134 may include any suitable combination of hardware to execute instructions and manipulate data to perform some or all of the described functions of radio network node 130, such as those described above. In some embodiments, the processor 134 may include, for example, one or more computers, one or more central processing units (CPUs), one or more microprocessors, one or more application specific integrated circuits (ASICs), one or more field programmable gate arrays (FPGAs) and/or other logic.

The memory 136 is generally operable to store instructions, such as a computer program, software, an application including one or more of logic, rules, algorithms, code, tables, etc. and/or other instructions capable of being executed by a processor 134. Examples of memory 136 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 146 is communicatively coupled to the processor 146 and may refer to any suitable device operable to receive input for radio network node 130, send output from radio network node 130, perform suitable processing of the input or output or both, communicate to other devices, or any combination of the preceding. The network interface 146 may include appropriate hardware (e.g., port, modem, network interface card, etc.) and software, including protocol conversion and data processing capabilities, to communicate through a network.

Other embodiments of radio network node 130 may include additional components beyond those shown in FIG. 9 that may be responsible for providing certain aspects of the radio network node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

Processors, interfaces, and memory similar to those described with respect to FIGS. 8 and 9 may be included in other network nodes (such as core network node 150). Other network nodes may optionally include or not include a wireless interface (such as the transceiver(s) described in FIGS. 8 and 9).

Figure 10:
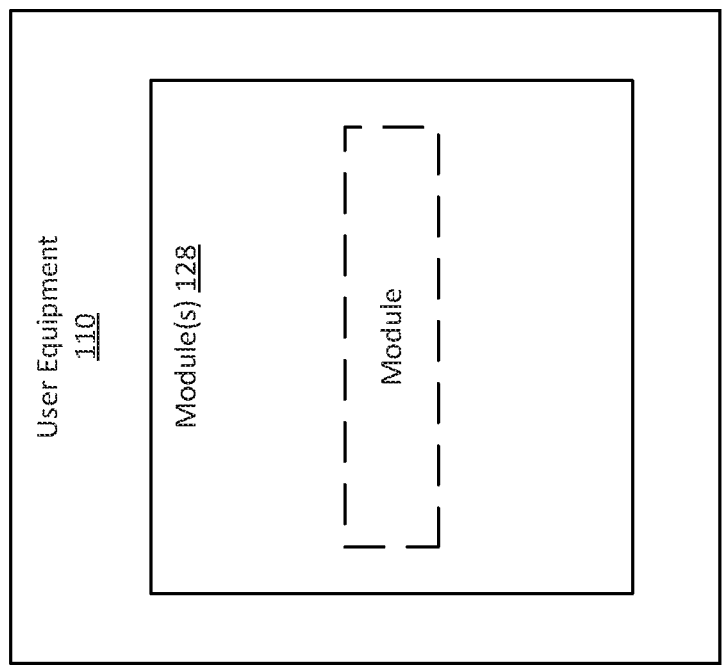
FIG. 10 is another block diagram of a user equipment (UE) in accordance with some embodiments.

Referring now to FIG. 10, in some embodiments, the UE 110 may comprise a series of modules 128 configured to implement at least some of the functionalities of the UE described above. For instance, in some embodiments, the UE 110 may comprise a first determining module configured to determine a need to perform a carrier aggregation, CA, activation procedure, a second determining module configured to determine a need to perform a sounding reference signal, SRS, switching procedure, an extending module configured to extend a delay associated with the CA activation procedure in order to allow the UE to perform the SRS switching procedure, and a performing module configured to perform the CA activation procedure within the extended delay.

It will be appreciated that the various modules may be implemented as combination of hardware and/or software, for instance, the processor 114, memory 116 and transceiver(s) 112 of UE 110 shown in FIG. 8. Some embodiments may also include additional modules and/or sub-modules to support or implement additional and/or optional functionalities.

Figure 11:
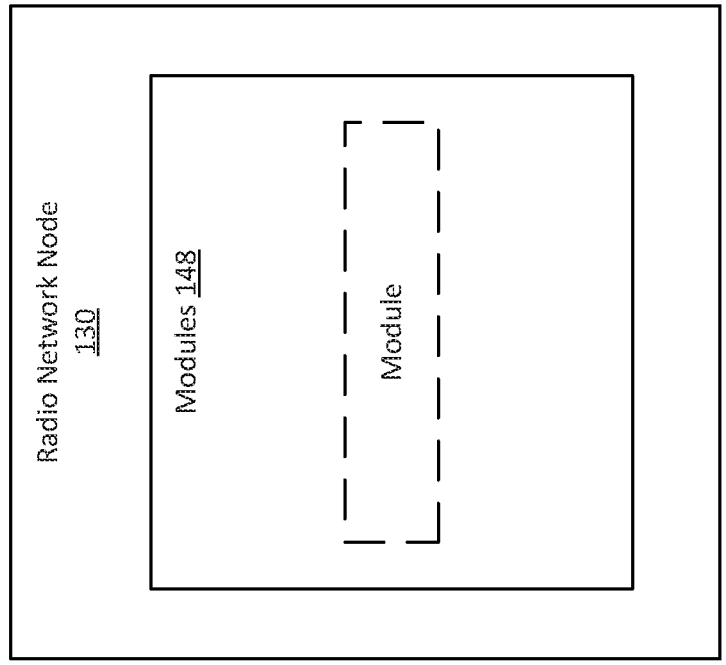
FIG. 11 is another block diagram of a radio network node in accordance with some embodiments.

Referring to FIG. 11, in some embodiments, the network node, which can be, for example, the radio network node 130, may comprise a series of modules 148 configured to implement at least some of the functionalities of the network node described above. For instance, in some embodiments, the network node may comprise a first determining module configured to determine that a UE may need to perform a carrier aggregation (CA) activation procedure, a second determining module configured determine that the UE may need to perform a SRS switching procedure, and a controlling module configured to control operations of the UE when the UE is in need to perform CA activation procedure and SRS switching procedure.

It will be appreciated that the various modules may be implemented as combination of hardware and/or software, for instance, the processor 134, memory 136 and transceiver(s) 132 of radio network node 130 shown in FIG. 9. Some embodiments may also include additional modules and/or sub-modules to support or implement additional and/or optional functionalities.

Some embodiments may also be represented as a computer program product comprising a non-transitory machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

ABBREVIATIONS

The present description may comprise one or more of the following abbreviation:
3GPP Third Generation Partnership Project
ACK Acknowledged
AGC Automatic gain control
AP Access point
BS Base Station
BSC Base station controller
BTS Base transceiver station
CA Carrier Aggregation
CC Component carrier
CGI Cell Global Identifier
CQI Channel Quality information
CRS Cell-specific Reference Signal
CSI Channel State Information
DAS Distributed antenna system
DC Dual connectivity
DCI Downlink Control Information
DL Downlink
DRX Discontinuous Reception
eNB E-UTRAN NodeB or evolved NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FDM Frequency Division Multiplexing
HD-FDD Half duplex FDD
LBT Listen Before Talk
LTE Long-Term Evolution
MAC Medium Access Control
MDT Minimization of Drive Tests
MeNB Master eNodeB
MIB Master Information Block
MME Mobility Management Entity
MPDCCH MTC Physical Downlink Control Channel
MSC Mobile Switching Center
MSR Multi-standard Radio
MTC Machine Type Communication
NACK Not acknowledged
NPBCH Narrowband Physical Broadcast Channel
NPDCCH Narrowband Physical Downlink Control Channel
NR New Radio O&M Operation and Maintenance
OSS Operations Support System
PBCH Physical Broadcast Channel
PCC Primary Component Carrier
PCell Primary Cell
PCFICH Physical Control Format Indicator Channel
PDCCH Physical Downlink Control Channel
PDSCH Physical Downlink Shared Channel
PHICH Physical HARQ indication channel
PRACH Physical Random Access Channel
PRS Positioning Reference Signal
PSCell Primary SCell
PSS Primary Synchronization Signal
PUCCH Physical Uplink Control Channel
PUSCH Physical Uplink Shared Channel
RACH Random Access Channel
RAT Radio Access Technology
RLM Radio Link Management
RRC Radio Resource Control
RRH Remote Radio Head
RRM Radio Resource Management
RRU Remote Radio Unit
RSCP Received Signal Code Power
RSRP Reference Signal Received Power
RSRQ Reference Signal Received Quality
RSSI Received Signal Strength Indicator
RSTD Reference Signal Time Difference
SCC Secondary Component Carrier
SCell Secondary Cell
SeNB Secondary eNodeB
SINR Signal to Interference and Noise Ratio
SNR Signal Noise Ratio
SON Self-organizing Network
SRS Sounding Reference Signal
SSS Secondary synchronization signal
TA Timing Advance
TAG Timing Advance Group
TDD Time Division Duplex
TTI Transmission Time Interval
UE User Equipment
UL Uplink
UMTS Universal Mobile Telecommunication System
UpPTS Uplink Pilot Time Slot
UTRA Universal Terrestrial Radio Access
UTRAN Universal Terrestrial Radio Access Network

What is claimed is:

1. A method in a user equipment, UE, the method comprising:
 determining a need to perform a carrier aggregation, CA, activation procedure;
 determining a need to perform a sounding reference signal, SRS, switching procedure;
 extending a delay associated with the CA activation procedure in order to allow the UE to perform and complete the SRS switching procedure before completing the CA activation procedure;
 performing the CA activation procedure;
 performing and completing the SRS switching procedure before completing the CA activation procedure; and
 completing the CA activation procedure within the extended delay.

2. The method as claimed in claim 1, wherein determining a need to perform a CA activation procedure comprises receiving, from a radio network node, a message comprising instructions to perform the carrier aggregation, CA, activation procedure.

3. The method as claimed in claim 2, wherein the CA activation procedure is a secondary cell, SCell, activation, and wherein the message comprising instructions to perform a CA activation procedure is a medium access control, MAC, control element, CE, comprising an SCell activation command.

4. The method as claimed in claim 3, wherein completing the CA activation procedure within the extended delay comprises activating the SCell and transmitting a channel status information, CSI, report to the radio network node or to another radio network node.

5. The method as claimed in claim 2, wherein the CA activation procedure is a secondary cell, SCell, deactivation, and wherein the message comprising instructions to perform a CA activation procedure is a medium access control, MAC, control element, CE, comprising an SCell deactivation command.

6. The method as claimed in claim 5, wherein completing the CA activation procedure within the extended delay comprises deactivating the SCell.

7. The method as claimed in claim 2, wherein the CA activation procedure is a primary secondary cell, PSCell, addition, and wherein the message comprising instructions to perform a CA activation procedure is a radio resource configuration, RRC, message comprising a pSCellToAddMod field.

8. The method as claimed in claim 7, wherein completing the CA activation procedure within the extended delay comprises configuring the PSCell.

9. The method as claimed in claim 2, wherein the CA activation procedure is a primary secondary cell, PSCell, release, and wherein the message comprising instructions to perform a CA activation procedure is a radio resource configuration, RRC, message comprising a pSCellToAddMod field.

10. The method as claimed in claim 9, wherein completing the CA activation procedure within the extended delay comprises releasing the PSCell.

11. The method as claimed in claim 2, wherein determining a need to perform a SRS switching procedure comprising receiving a SRS request message from the radio network node or from another radio network node.

12. A user equipment, UE, comprising processing circuitry, the processing circuitry having a processor and a memory, the processing circuitry being configured to:
 determine a need to perform a carrier aggregation, CA, activation procedure;
 determine a need to perform a sounding reference signal, SRS, switching procedure;
 extend a delay associated with the CA activation procedure in order to allow the UE to perform and complete the SRS switching procedure before completing the CA activation procedure;
 perform the CA activation procedure;
 perform and complete the SRS switching procedure before completing the CA activation procedure; and
 complete the CA activation procedure within the extended delay.

13. The UE as claimed in claim 12, wherein when determining a need to perform a CA activation procedure, the processing circuitry is further configured to receive, from a radio network node, a message comprising instructions to perform the carrier aggregation, CA, activation procedure.

14. The UE as claimed in claim 13, wherein the CA activation procedure is a secondary cell, SCell, activation, and wherein the message comprising instructions to perform a CA activation procedure is a medium access control, MAC, control element, CE, comprising an SCell activation command.

15. The UE as claimed in claim 14, wherein when completing the CA activation procedure within the extended delay, the processing circuitry is further configured to activate the SCell and transmit a channel status information, CSI, report to the radio network node or to another radio network node.

16. The UE as claimed in claim 13, wherein the CA activation procedure is a secondary cell, SCell, deactivation, and wherein the message comprising instructions to perform a CA activation procedure is a medium access control, MAC, control element, CE, comprising an SCell deactivation command.

17. The UE as claimed in claim 16, wherein when completing the CA activation procedure within the extended delay, the processing circuitry is further configured to deactivate the SCell.

18. The UE as claimed in claim 13, wherein the CA activation procedure is a primary secondary cell, PSCell, addition, and wherein the message comprising instructions to perform a CA activation procedure is a radio resource configuration, RRC, message comprising a pSCellToAddMod field.

19. The UE as claimed in claim 18, wherein when completing the CA activation procedure within the extended delay, the processing circuitry is further configured to configure the PSCell.

20. The UE as claimed in claim 13, wherein the CA activation procedure is a primary secondary cell, PSCell, release, and wherein the message comprising instructions to perform a CA activation procedure is a radio resource configuration, RRC, message comprising a pSCellToAddMod field.

21. The UE as claimed in claim 20, wherein when completing the CA activation procedure within the extended delay, the processing circuitry is further configured to release the PSCell.

22. The UE as claimed in claim 13, wherein when determining a need to perform a SRS switching procedure, the processing circuitry is further configured to receive a SRS request message from the radio network node or from another radio network node.

* * * * *